United States Patent [19]

Torobin

[11] 4,303,433

[45] Dec. 1, 1981

[54] CENTRIFUGE APPARATUS AND METHOD FOR PRODUCING HOLLOW MICROSPHERES

[76] Inventor: Leonard B. Torobin, c/o Materials Technology Corp., P.O. Box 6844, Bellevue, Wash. 98001

[21] Appl. No.: 179,158

[22] Filed: Aug. 18, 1980

Related U.S. Application Data

[63] Continuation of Ser. No. 77,720, Sep. 21, 1979, abandoned, which is a continuation-in-part of Ser. No. 69,295, Aug. 24, 1979, abandoned, and Ser. No. 59,296, Jul. 20, 1979, abandoned, and Ser. No. 59,297, Jul. 20, 1979, abandoned, and Ser. No. 944,643, Sep. 21, 1978, abandoned, and Ser. No. 937,123, Aug. 28, 1978, abandoned.

[51] Int. Cl.³ ................... C03B 19/10; C03C 25/02
[52] U.S. Cl. ........................... 65/21.4; 264/8; 264/12; 264/50; 264/70; 264/513; 425/7; 425/8; 425/463; 425/DIG. 217
[58] Field of Search .............. 65/2, 5, 16, 21.4, 22, 65/60 C, 142; 264/5, 8, 12, 42, 50, 70, 142, 167, 170, 513, 517; 425/7, 8, 462, 463, 804, DIG. 217

[56] References Cited

U.S. PATENT DOCUMENTS

| | | | |
|---|---|---|---|
| 948,541 | 2/1910 | Coleman | 65/22 X |
| 3,186,812 | 6/1965 | Pfaneder | 65/21 X |
| 3,257,183 | 6/1966 | Slayter et al. | 65/16 X |
| 3,282,066 | 11/1966 | Searight | 65/22 X |
| 3,421,873 | 1/1969 | Burgman et al. | 65/2 |
| 3,765,853 | 10/1973 | Riebling | 65/31 |
| 3,877,918 | 4/1975 | Cerbo | 65/21 X |
| 4,026,499 | 5/1977 | Crosby | 65/21 X |
| 4,116,656 | 9/1978 | Mukai et al. | 264/12 |

Primary Examiner—Robert L. Lindsay, Jr.
Attorney, Agent, or Firm—Perry Carvellas

[57] ABSTRACT

The hollow glass vacuum microspheres are made by forming a liquid film of molten glass across the coaxial blowing nozzles, applying the metal vapor blowing gas at a positive pressure on the inner surface of the glass film to blow the film which combines with the centrifugal force to form an elongated cylinder shaped liquid film of molten glass. A transverse jet is used to direct the inert entraining fluid over and around the blowing nozzle at an angle to the axis of the blowing nozzle. The entraining fluid as it passes over and around the blowing nozzle fluid dynmically induces a pulsating or fluctuating pressure field at the opposite or lee side of the blowing nozzle in the wake or shadow of the coaxial blowing nozzle. The continued movement of the entraining fluid over the elongated cylinder produces asymmetric fluid drag forces on the cylinder and closes and detaches the elongated cylinder from the coaxial blowing nozzle and the detached cylinder by the action of surface tension forms into a spherical shape.

Quench nozzles are disposed radially away from the rotor and direct cooling fluid downwardly at and into contact with the hollow glass amicrospheres to rapidly cool and solidify the molten glass to form a hard, smooth hollow glass microsphere and where metal vapor blowing gas is used to cool and condense the metal vapor and to deposit the metal vapor on the inner wall surface of the microsphere as a thin metal coating.

72 Claims, 6 Drawing Figures

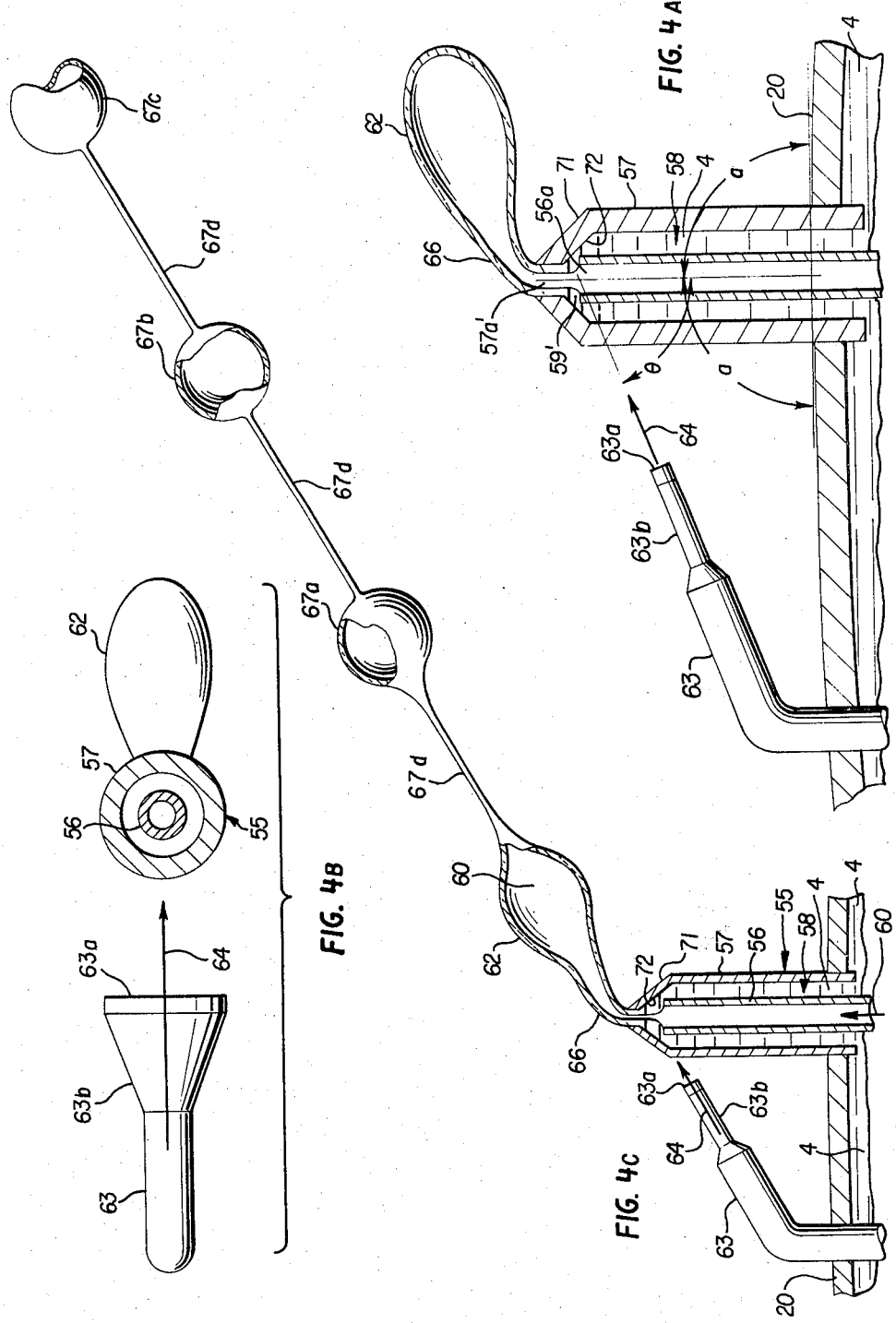

CENTRIFUGE APPARATUS AND METHOD FOR PRODUCING HOLLOW MICROSPHERES

This is a continuation, of Application Ser. No. 077,720, filed Sept. 21, 1979 which application is a continuation-in-part of applications Ser. No. 069,295, filed Aug. 24, 1979, Ser. No. 059,296, July 20, 1979, Ser. No. 059,297, filed July 20, 1979, Ser. No. 944,643, filed Sept. 21, 1978 and Ser. No. 937,123, filed Aug. 28, 1978 all abandoned.

The present invention relates to hollow microspheres made from inorganic film forming materials and compositions and particularly to hollow glass microspheres and to a centrifuge apparatus and process of using the apparatus for making the microspheres.

The present invention particularly relates to the centrifuge apparatus and method of using the apparatus to make hollow glass vacuum microspheres having a thin reflective metal coating deposited on the inner wall surface of the microspheres.

The present invention relates to a centrifuge apparatus and to the use of the apparatus to make hollow glass microspheres. The present invention relates to the use of a centrifuge having a plurality of coaxial blowing nozzles disposed in the outer peripheral wall of the rotor. The molten glass is supplied to the centrifuge and by centrifugal force is caused to coat the inner surface of the peripheral wall of the rotor. A blowing gas is supplied to the centrifuge through a hollow center post on which the centrifuge is carried or supported and through a second concentric shell and through the coaxial blowing nozzle. An entraining fluid is also supplied to the centrifuge through the hollow center post and a first concentric shell, the second concentric shell and through a transverse jet directed at the coaxial blowing nozzle.

The present invention more particularly relates to a centrifuge apparatus and method for using coaxial blowing nozzles disposed on the peripheral wall of the rotor to make hollow glass microspheres. The method of making the microspheres from the liquid glass composition comprises subjecting the microsphere during its formation to an external pulsating or fluctuating pressure field having periodic oscillations, said pulsating or fluctuating pressure field acting on said microsphere to assist in its formation and to assist in detaching the microsphere from said blowing nozzle.

The invention particularly relates to a method and apparatus for blowing the microspheres from inorganic film forming materials or compositions and particularly to blowing microspheres from a molten glass using a coaxial blowing nozzle and an inert blowing gas or a metal vapor to blow the molten glass to form a hollow glass microsphere.

The invention also relates to a method and apparatus for blowing the microspheres from liquid glass compositions using a coaxial blowing nozzle and a blowing gas or a blowing gas containing dispersed metal particles and/or an organo metal compound to blow the liquid glass to form a hollow glass microsphere. The metal particles deposit and/or the organo metal compound decomposes to deposit a thin transparent or reflective metal coating on the inner wall surface of the microsphere.

The transverse jet is used to direct an inert entraining fluid over and around the blowing nozzle at an angle to the axis of the blowing nozzle. The entraining fluid as it passes over and around the blowing nozzle envelops and acts on the molten glass as it is being blown to form the microsphere and to detach the microsphere from the coaxial blowing nozzle. Stationary quench means are disposed radially outward from the blowing nozzles and direct a quench fluid downward onto the microspheres to rapidly cool and solidify the microspheres and to cause the microspheres to flow downwardly along but out of contact with the inner wall surface of the centrifuge housing.

The present invention also relates to hollow glass vacuum microspheres having a thin reflective metal coating deposited on the inner wall surface of the microsphere. The present invention relates to hollow glass microspheres for use as a filler material in plastics, in plastic foam compositions and in concrete and asphalt compositions.

The present invention also relates to the use of the hollow glass microspheres as filler materials in syntactic foam systems.

The present invention also relates to the use of the hollow glass microspheres and the hollow glass vacuum microspheres in the manufacture of superior insulation materials for use in construction of homes, factories and office buildings and in the manufacture of products in which heat barriers are desired or necessary and in particular in the construction of highly efficient solar energy collectors.

The present invention also relates to a apparatus and method for making filamented glass microspheres with thin glass filaments connecting adjacent microspheres and to the filamented microspheres themselves.

The hollow glass microspheres of the present invention, depending on their diameter and their wall thickness and the particular glass composition from which they are made, are capable of withstanding relatively high external pressures and/or weight. Hollow glass microspheres can be made that are resistant to high temperatures and stable to many chemical agents and weathering conditions. These characteristics make the microspheres suitable for a wide variety of uses.

BACKGROUND OF THE INVENTION

In recent years, the substantial increases in the energy costs of heating and cooling has encouraged the development of new and better insulation materials and many new insulation materials have been developed in an attempt to satisfy this need.

In recent years, the substantial increases in costs of basic materials such as plastics, cement, asphalt and the like has also encouraged development and use of filler materials to reduce the amount and costs of the basic materials used and the weight of the finished materials. One of the newly suggested filler materials utilizes hollow glass microspheres. The known methods for producing hollow glass microspheres have not been successful in producing microspheres of uniform size or uniform thin walls which makes it very difficult to produce filler and insulation materials of controlled and predictable physical and chemical characteristics and quality.

One of the existing methods of producing hollow glass microspheres for use as insulating materials, for example, as disclosed in the Veatch et al U.S. Pat. No. 2,797,201 or Beck et al U.S. Pat. No. 3,365,315 involves dispersing a liquid and/or solid gas-phase precursor material in the glass material to be blown to form the microspheres. The glass material containing the solid or liquid gas-phase precursor enclosed therein is then heated to convert the solid and/or liquid gas-phase precursor material into a gas and is further heated to expand the gas and produce the hollow glass microsphere containing therein the expanded gas. This process is, understandably, difficult to control and of necessity, i.e. inherently, produces glass microspheres of random size and wall thickness, microspheres with walls that have sections or portions of the walls that are relatively thin, walls that have holes, small trapped bubbles, trapped or dissolved gases, any one or more of which will result in a substantial weakening of the microspheres, and a substantial number or proportion of microspheres which are not suitable for use and must be scrapped or recycled.

In addition, in some applications, the use of low density microspheres presents a serious problem because they are difficult to handle since they are readily elutriated and tend to blow about. In situations of this type, the filamented microspheres of the present invention provide a convenient and safe method of handling the microspheres.

It is also been suggested that hollow glass vacuum microspheres having a reflective metal deposited on the inner wall surface thereof be used to make insulating materials. There have been several methods suggested for making this type of hollow vacuum microsphere but to date none of the known methods are believed to have been successful in making any such microspheres.

Further, the existing methods practiced to produce hollow glass microspheres usually rely on high soda content glass compositions because of their relatively low melting points. Many of these glass compositions were found to have poor long term weathering characteristics.

Thus, the known methods for producing hollow glass microspheres have therefore not been successful in producing microspheres of uniform size or uniform thin walls or in producing hollow glass microspheres of controlled and predictable physical and chemical characteristics, quality and strength.

In addition, applicant found in his initial attempts to use an inert blowing gas to blow a thin molten glass film to form a hollow glass microsphere that the formation of the glass microsphere was extremely sensitive and that unstable films were produced which burst into minute sprays of droplets before a molten glass film could be blown into a microsphere and detached from a blowing nozzle. There was also a tendency for the molten glass fluid to creep up the blowing nozzle under the action of wetting forces. Thus, initial attempts to blow hollow glass microspheres from thin molten glass films were unsuccessful.

OBJECTS OF THE INVENTION

It is an object of the present invention to provide a centrifuge apparatus and a method for using the apparatus to make hollow glass microspheres.

It is another object of the present invention to provide a centrifuge apparatus having a plurality of coaxial blowing nozzles disposed in the peripheral wall of the centrifuge rotor.

It is another object of the present invention to produce hollow glass microspheres having uniform thin walls which walls are substantially free of trapped gas bubbles or dissolved gases or solvents which can form bubbles and/or escape.

It is another object of the present invention to produce hollow glass microspheres which are substantially resistant to heat, chemical agents and alkali materials.

It is another object of the invention to produce hollow glass microspheres having thin walls of a low heat conductivity glass.

It is another object of the present invention to produce hollow glass microspheres having a low heat conductivity gas contained within the microsphere.

It is another object of the present invention to produce hollow glass vacuum microspheres having deposited on the inner wall surface thereof a thin transparent metal coating.

It is another object of the present invention to produce hollow glass vacuum microspheres having deposited on the inner wall surface thereof a low emissivity.

It is another object of the present invention to produce in an economical simple manner hollow glass microspheres which are substantially spherical in shape, uniform in size, wall thickness, and strength and thermal insulating characteristics.

It is another object of the present invention to utilize the hollow glass microspheres of the present invention in the manufacture of improved insulating materials and insulating systems.

It is another object of the present invention to make hollow glass microspheres for use as and/or in filler materials.

It is another object of the present invention to utilize the hollow glass microspheres in the manufacture of syntactic foam systems and/or molded forms or shapes.

It is still another object of the present invention to utilize the hollow glass microspheres in the construction and manufacture of superior insulating materials for high temperature applications and the retardation of fires.

It is another object of the present invention to produce hollow glass filamented microspheres with a thin glass filament connecting adjacent glass microspheres.

BRIEF DESCRIPTION OF THE INVENTION

The present invention relates to a centrifuge apparatus and to a process for using the apparatus to make hollow glass microspheres and hollow glass vacuum microspheres. The invention specifically relates to a centrifuge apparatus having disposed on the peripheral wall thereof a plurality of coaxial blowing nozzles and to means of supplying to the coaxial blowing nozzles molten glass and a blowing gas and means for supplying an entraining fluid and stationary means for supplying a quench fluid for quenching the microspheres.

The apparatus and process of the present invention permit substantial increases in the production of hollow glass microspheres and hollow glass vacuum microspheres by utilizing the centrifugal force developed by rotation of the centrifuge rotor to supply molten glass under pressure to the coaxial blowing nozzles and to assist in distending and in detaching of the microspheres from the orifice of the coaxial blowing nozzle. The centrifuge apparatus provides a method by which the molten glass can be extruded under pressure through the coaxial blowing nozzles without having to maintain the molten glass under high pressure.

The present invention more particularly relates to the use of a centrifuge in the manufacture of hollow glass microspheres in an economical and efficient manner. The hollow glass microspheres can be used in the manufacture of superior insulation materials and systems and improved filler materials.

The hollow glass microspheres of the present invention are made by forming a liquid film of molten glass across the coaxial blowing nozzle, applying an inert gas or metal vapor at a positive pressure on the inner surface of the glass film to blow the film and in combination with the centrifugal force to form an elongated cylinder shaped liquid film of molten glass which is closed at its outer end.

The hollow glass microspheres of the present invention can also be made by applying a gas or a gas containing dispersed metal particles and/or a gaseous organo metal compound at a positive pressure to the inner surface of the glass film to blow the film and form an elongated cylinder shaped liquid film of glass which is closed at its outer end. A balancing but slightly lower gas pressure is provided in the area of the blowing nozzle into which the elongated cylinder shaped liquid glass film is blown.

A transverse jet is used to direct an entraining fluid over and around the blowing nozzle at an angle to the axis of the blowing nozzle. The entraining fluid as it passes over and around the blowing nozzle and the elongated cylinder fluid dynamically induces a pulsating or fluctuating pressure field at the opposite or lee side of the blowing nozzle in the wake or shadow of the blowing nozzle. The fluctuating pressure field has regular periodic oscillations similar to those of a flag flapping in a breeze.

The transverse jet entraining fluid can also be pulsed at regular intervals to assist in controlling the size of the microspheres and in separating the microspheres from the blowing nozzle and the distance or spacing between microspheres.

The entraining fluid envelops and acts asymmetrically on the elongated cylinder and causes the cylinder to flap, fold, pinch and close-off at its inner end at a point proximate to the coaxial blowing nozzle. The continued movement of the entraining fluid over the elongated cylinder produces fluid drag forces on the cylinder and detaches the elongated cylinder from the coaxial blowing nozzle and entrains it in the entraining fluid. The surface tension forces of the molten glass act on the now detached entrained elongated cylinder and cause the cylinder to seek a minimum surface area and to form a spherical shape.

Quench nozzles are disposed on the stationary housing radially outward from the peripheral wall of the rotor and direct cooling fluid downwardly at and into contact with the molten glass microspheres to rapidly cool and solidify the molten glass and form a hard, smooth hollow glass microsphere. Where a metal vapor is used as a blowing gas to blow the microspheres, the quench fluid cools and condenses the metal vapor and causes the metal vapor to deposit on the inner wall surface of the microsphere as a transparent metal coating or a thin reflective metal coating.

The microspheres can be made from a glass composition or a low heat conductivity glass composition and can contain a low heat conductivity gas. The microspheres can also be made to contain a high vacuum and a thin metal coating deposited on the inner wall surface of the microspheres.

The microspheres can also be made to contain a gas at above or below or at about ambient pressure and a thin metal coating deposited on the inner wall surface of the microspheres.

The metal coating, depending on its thickness, can be transparent or highly reflective. The use of a high vacuum and a reflective metal coating substantially improves the insulating characteristics of the microspheres.

The use of microspheres with a reflective metal coating but without a high vacuum still improves the heat insulating characteristics of the microspheres.

The glass microspheres of the present invention can be used to form a heat barrier by using them to fill void spaces between existing walls or other spaces and by forming them into sheets or other shaped forms to be used as insulation barriers.

In one embodiment of the invention, the microspheres are coated with an adhesive or foam filler and flattened to an oblate spheroid or a generally cellular shape. The use of the flattened microspheres substantially reduces the volume of the interstices between the microspheres and significantly improves the thermal insulating characteristics of the microspheres.

The microspheres can be made from glass compositions selected for their desired optical and chemical properties and for the particular gaseous material to be contained therein.

Where a gas containing dispersed metal particles is used to blow the microspheres, a metal layer is deposited on the inner wall surface of the microsphere as a thin metal coating. Where a gaseous organo metal compound is used to deposit the metal layer, a gaseous organo metal compound is used as or with the blowing gas to blow the microspheres. The organo metal compound can be decomposed just prior to blowing the microspheres or after the microspheres are formed by, for example, subjecting the blowing gas or the microspheres to heat and/or an electrical discharge.

The filamented microspheres are made in a manner such that they are connected or attached to each other by a thin continuous glass filament. The filamented microspheres can also be flattened to produce the oblate spheroids. The filamented microspheres also assist in handling and preventing scattering of microspheres, particularly where very small diameter microspheres or low density microspheres are produced.

THE ADVANTAGES

The present invention overcomes many of the problems associated with prior attempts to produce hollow glass microspheres and hollow glass vacuum microspheres containing a metal coating deposited on the inner wall surface thereof. The apparatus and process of the present invention allows the production of hollow glass microspheres having predetermined characteristics such that superior insulation materials and systems and improved filler materials can be designed, manufactured and tailor made to suit a particular desired use. The diameter, wall thickness and uniformity and the thermal, strength and chemical resistance characteristics of the microspheres can be determined by carefully selecting the constituents of the glass composition and controlling the inert gas or metal vapor pressure and the temperature, and the temperature, viscosity, surface tension, and thickness of the molten glass film from which the microspheres are formed. The inner volume of the microspheres may contain an inert low conductivity gas used to blow the microsphere or can contain a high vacuum produced by condensing a metal vapor used to blow the microsphere. The hollow glass microspheres and the hollow glass vacuum microspheres of the present invention can have a transparent metal coating deposited on the inner wall surface thereof which allows sunlight to pass through the microspheres but reflects and traps infrared radiations. The hollow glass microspheres and the hollow glass vacuum microspheres can also have a low emissivity highly reflective metal coating deposited on the inner wall surface of the microsphere which effectively reflects light and radiant heat energy and avoids the wear and deterioration that occurs by utilizing an outer coating of a reflective metal caused by point to point contact of the microspheres with adjacent spheres and/or chemical degradation due to chemical agents in the surrounding atmosphere.

The apparatus and process of the present invention provide a practical and economical means by which hollow glass microspheres having a high heat insulation efficiency can be utilized to prepare a relatively low cost efficient insulating material for every day uses.

The apparatus and process of the present invention provide a practical and economical means by which the high heat insulation efficiency of a vacuum can be utilized to prepare a relatively low cost highly efficient insulating material for common every day uses. The present invention also allows the economical production of hollow glass microspheres from a low or high melting temperature glass composition which incorporates a radiation barrier and can be used as an insulating material. The apparatus and process of the present invention provide for the production of hollow glass microspheres at economic prices and in large quantities.

The apparatus and process of the present invention, as compared to the prior art processes of using a latent liquid or solid blowing agent, can be conducted at higher temperatures since there is no included expandable and/or decomposable blowing agent used. The ability to use higher blowing temperatures results in for particular glass compositions a lower glass viscosity which allows surface tension forces to produce significantly greater uniformity in wall thickness, sphericity and diameter of the microspheres produced.

The apparatus and process of the present invention allow the use of a wide variety of blowing gases and blowing gas materials to be used and encapsulated.

The present invention provides a method for using a metal vapor blowing gas to blow hollow glass microspheres to obtain a high contained vacuum within the microsphere. The present invention also allows for the addition to metal vapor blowing gas small amounts of selected metal vapors, e.g. alkali metal vapors, to getter, i.e. react with trace gases that may evolve from the molten glass film as the microsphere is being formed. The selected metal vapors getter any evolved gases and maintain the high contained vacuum.

The process and apparatus of the present invention allows the production of hollow glass microspheres for insulation and/or filler uses having predetermined diameters, wall thicknesses, strength and resistance to chemical agents and weathering and gas permeability such that superior systems can be designed, manufactured and tailor made to suit a particular desired use. In addition, the surface of the hollow glass microspheres, because of the method by which they are made, do not have, i.e. are free of sealing tips.

BRIEF DESCRIPTION OF THE DRAWINGS

The attached drawings illustrate exemplary forms of the centrifuge apparatus and method of using the apparatus of the present invention for making microspheres for use in and as insulating materials and/or for use in and as filler materials.

The FIG. 1 of the drawings is a diagrammatic section of a generally vertical plane through the diameter of a centrifuge having a generally cylindrically shaped rotor and showing multiple coaxial blowing nozzle means for supplying the molten glass, the gaseous material for blowing hollow glass microspheres, a transverse jet (FIG. 2) providing an entraining fluid to assist in the formation and detachment of the microspheres from the blowing nozzles, baffle means and means for supplying a quench fluid to cool the microspheres.

Figure 1:
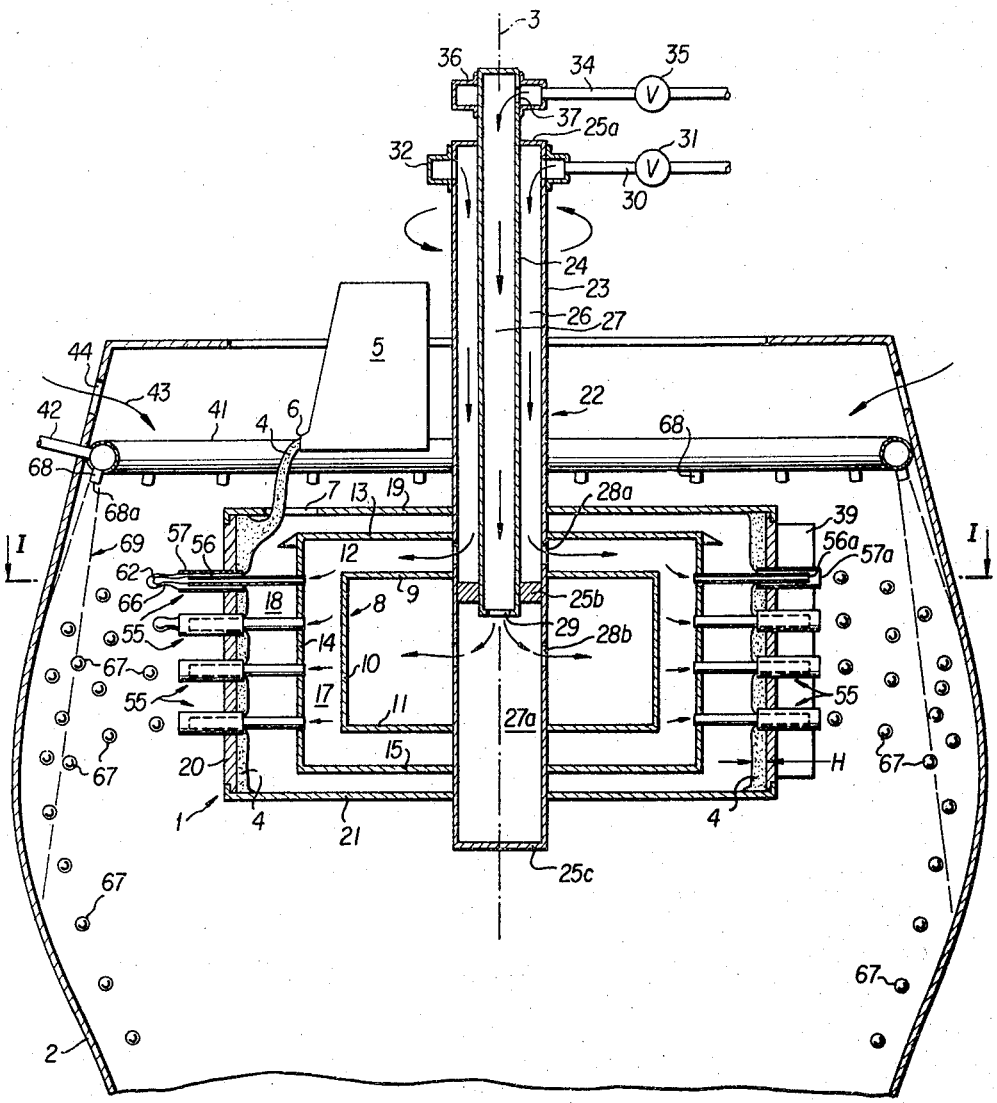
Figure 2:
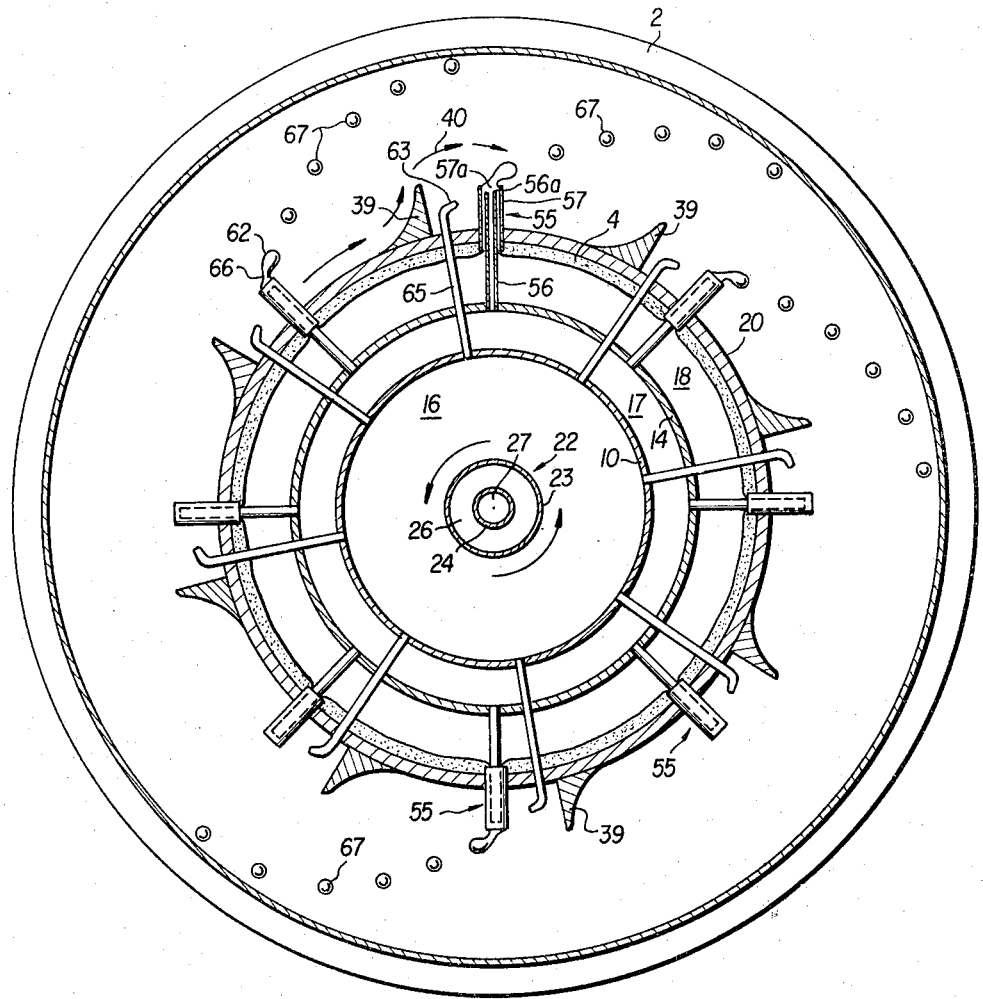

The FIG. 2 of the drawings is a top plane view of the centrifuge apparatus of FIG. 1 taken through line I—I.

Figure 3:
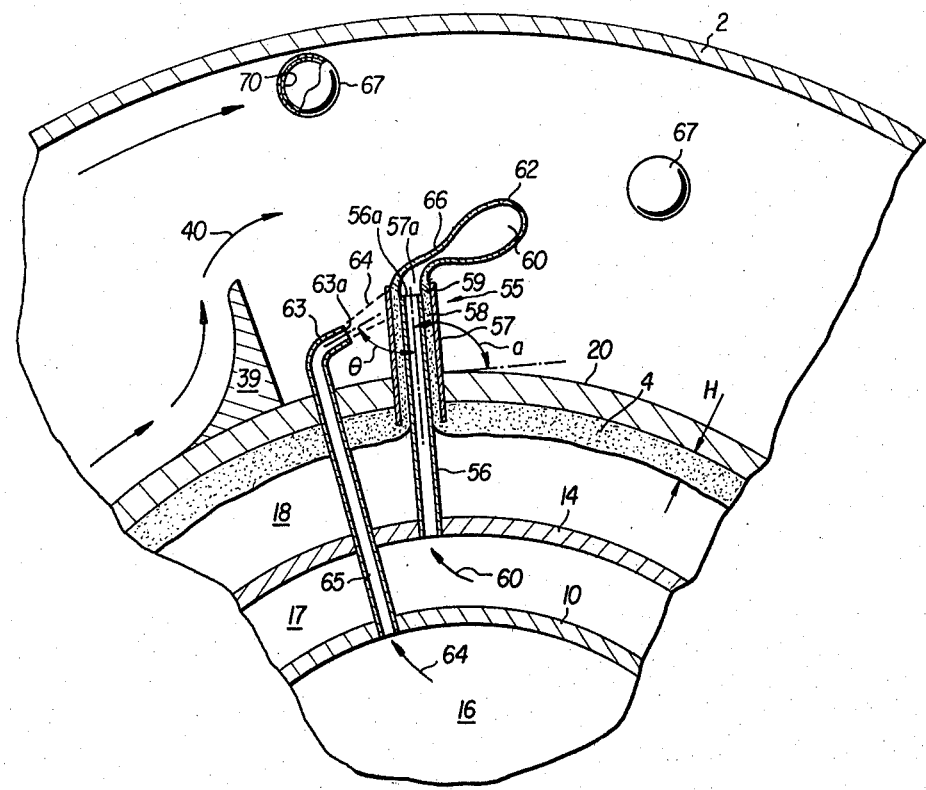

The FIG. 3 of the drawings is a top view of an enlarged detailed cross-section of the coaxial blowing nozzle, the transverse jet entraining means and the fluid or air deflection baffle shown in FIG. 2.

The FIG. 4a of the drawings is a detailed cross-section of a modified form of the nozzle means shown in FIG. 3 in which the lower end of the nozzle means is tapered inwardly and showing a detailed cross-section of a modified transverse jet entraining means having a flattened orifice opening.

The FIG. 4b of the drawings is a top plane view of the modified transverse jet entraining means and the nozzle means illustrated in FIG. 4a of the drawings.

FIG. 4c of the drawings illustrates the use of the apparatus of FIG. 4b to make filamented hollow glass microspheres.

DETAILED DISCUSSION OF THE DRAWINGS

The invention will be described with reference to the accompanying Figures of the drawings wherein the like numbers designate like parts throughout the several views.

Referring to FIGS. 1, 2 and 3 of the drawings, there is illustrated a centrifuge A enclosed within hollow stationary housing 2.

The novel centrifuge apparatus of the present invention comprises a center post 22 on which are carried to rotate therewith a first concentric shell 8, a second concentric shell 12 and a rotor 1. The first concentric shell 8 encloses a cylindrical chamber 16. The first concentric shell 8 and second concentric shell 12 together form annular chamber 17. The rotor 1 and the second concentric shell 12 together form outer annular chamber 18.

The center post 22 consists of hollow cylindrical pipe 23 containing therein hollow concentric pipe 24. The cylindrical pipe 23 and concentric pipe 24 rotate together and form between them annular space 26. The annular space 26 is sealed at its upper end by a gas sealing gasket or disc 25a and at its lower end by a gas sealing gasket or disc 25b. The concentric pipe 24 terminates at a point below sealing gasket or disc 25b and has an opening 29 at the lower end thereof. The hollow cylindrical pipe 23 is sealed at its lower end by sealing gasket or disc 25c. The sealing gasket 25b and sealing gasket 25c together with the lower portion of hollow cylindrical pipe 23 form a cylindrical chamber 27a.

The hollow cylindrical pipe 23 has surrounding its upper portion a concentric collar 32 which is provided with gas sealing means, not shown, and a blowing gas feed line 30. The upper portion of cylindrical pipe 23 contains radial openings 33 which provide communication between the blowing gas feed line 30, the inside of concentric collar 32 and the annular space 26 formed between cylindrical pipe 23 and concentric pipe 24. The lower portion of cylindrical pipe 23 contains radial openings 28a positioned above gas sealing disc 25b and radial openings 28b positioned below gas sealing disc 25b. The flow of blowing gas feed is controlled by valve 31.

The hollow concentric pipe 24 has surrounding its upper portion a concentric collar 36 which is provided with gas sealing means, not shown, and an entraining fluid feed line 34. The upper portion of concentric pipe 24 contains radial openings 37 which provide communication between entraining fluid feed line 34, the inside of concentric collar 36 and the central space 27 in concentric pipe 24. The flow of entraining fluid is controlled by valve 35.

The molten glass is contained in reservoir 5 and is fed to the centrifuge through feed opening 6 and annular opening 7 in the top portion of the upper wall 19 of rotor 1. The molten glass feed 4 forms a layer "H" on the inner surface of peripheral wall 20 of rotor 1 and flows into and fills annular space 58 between outer coaxial nozzle 57 and inner coaxial nozzle 56.

The coaxial blowing nozzle 55 can be made separately or can be formed by an outward extension of the peripheral wall 20 of rotor 1. The coaxial blowing nozzles 55 are contained on the peripheral wall 20 of rotor 1 and comprise an outer nozzle 57 and an inner nozzle 56 which form therebetween an annular space 58 (FIG. 3). The outer nozzle 57 is attached and passes through the peripheral wall 20 of rotor 1. The inner nozzle 56 is disposed concentric to the nozzle 57 and extends to and through the outer wall 14 of the second concentric shell 12. The coaxial blowing nozzle 55 consists of an inner nozzle 56 having an orifice 56a for a blowing gas, an inert blowing gas or metal vapor blowing gas and an outer nozzle 57 having an orifice 57a for molten glass. The inner nozzle 56 is disposed within and coaxial to outer nozzle 57 to form annular space 58 between nozzles 56 and 57, which annular space provides a flow path for molten glass 4. The orifice 56a of inner nozzle 56 terminates at or a short distance radially inward of the plane of orifice 57a of outer nozzle 57.

The molten glass 4 at a slightly positive pressure or at elevated pressure flows downwardly through annular space 58 and fills the area between orifice 56a and 57a. The surface tension forces in molten glass 4 form a thin liquid molten glass film 59 across orifices 56a and 57a.

A blowing gas 60, inert blowing gas, metal vapor blowing gas and/or a blowing gas containing dispersed metal particles is heated by means not shown to about the temperature of the molten glass and which is at a pressure above the molten glass pressure at the blowing nozzle. The blowing gas feed is fed through valve 31, feed line 30, concentric collar 32, radial openings 33, annular space 26, radial openings 28a, into annular chamber 17 and through inner coaxial nozzle 56. The blowing gas is fed through inner coaxial nozzle 56 and brought into contact with the inner surface of molten glass film 59. The blowing gas or metal vapor exerts a positive pressure on the molten glass film to blow and distend the film outwardly to form an elongated cylinder shaped liquid film 62 of molten glass filed with the blowing gas or metal vapor 60. The elongated cylinder 62 is closed at its outer end and is connected at its inner end to outer nozzle 57 at the peripheral edge of orifice 57a. A balancing pressure of a gas or of an inert gas, i.e. a slightly lower pressure, is provided in the area of the blowing nozzle into which the elongated cylinder shaped liquid film is blown. The illustrated coaxial nozzle can be used to produce microspheres having diameters three to five times the size of the inside diameter of orifice 57a and is useful in blowing low viscosity glass materials.

The transverse jet 63 (FIGS. 2 and 3) is attached to and passes through the outer peripheral wall 20 of rotor 1 and extension 65 extends through the outer wall 14 of the second concentric shell 12 and through the outer wall 10 of the first concentric shell 8.

The transverse jet 63 is used to direct an inert entraining fluid 64, which is heated to about, below or above the temperature of the molten glass 4, by means not shown.

The entraining fluid 64 is fed through valve 35, feed line 34, concentric collar 36, radial openings 37, central space 27, chamber 27a, radial openings 28b, cylindrical chamber 16, and through transverse jet extension conduit 65 and transverse jet 63. The entraining fluid 64 is fed through transverse jet nozzle orifice 63a and directed at the coaxial blowing nozzle 55. The transverse jet 63 is aligned to direct the flow of entraining fluid 64 over and around blowing nozzle 55 in the microsphere forming region at and behind the orifice 57a. The entraining fluid 64 as it passes over and around blowing nozzle 55 fluid dynamically induces a pulsating or fluctuating pressure field in the entraining fluid 64 at the opposite or lee side of blowing nozzle 55 in its wake or shadow.

The entraining fluid 64 envelops and acts on the elongated cylinder 62 in such a manner as to cause the cylinder to flap, fold, pinch and close-off at its inner end at a point 66 proximate to the orifice 57a of outer nozzle 57. The continued movement of the entraining fluid 64 over the elongated cylinder 62 produces fluid drag forces on the cylinder 62 and detaches it from the orifice 57a of the outer nozzle 57 to allow the cylinder to be entrained and transported away from nozzle 57. The surface tension forces of the molten glass act on the entrained, falling elongated cylinder 62 and cause the cylinder to seek a minimum surface area and to form a spherical shape hollow molten glass microsphere 67.

The centrifuge housing 2 contains on the inner wall thereof an annular manifold 41. A quench fluid supply line 42 passes through the wall of the housing 2 and is connected to the manifold 41. The manifold 41 contains on the lower portion thereof at circumferentially spaced apart points about the periphery of rotor 1 a plurality of quench nozzles 68 having orifice openings 68a through which quench fluid is directed at the microspheres after they are formed and detached from the blowing nozzle.

The quench nozzles 68 direct cooling fluid 69 at and into contact with the molten glass microsphere 67 to rapidly cool and solidify the molten glass and form a hard, smooth hollow glass microsphere. The quench fluid 69 also serves to carry the hollow glass microsphere away from the coaxial blowing nozzle 55. Where a metal vapor is used as a blowing gas to blow the microspheres, the quench fluid cools and condenses the metal vapor to deposit the metal vapor on the inner wall surface of the microsphere as a transparent or reflective thin metal coating 70. Additional cooling time, if necessary, can be provided by using a fluidized bed, liquid carrier or belt carrier system for the hollow glass microspheres to harden the microspheres with substantially little or no distortion or effect on the size or shape of the microspheres. The cooled and solidified hollow gas microspheres are collected by suitable means not shown.

The baffle 39 is mounted vertically on the peripheral wall 20 of rotor 1 and, depending on its shape and dimensions and distance from the coaxial blowing nozzle 55, can effectively deflect fluid or gas flow away from the orifice 57a of outer coaxial nozzle 57 of blowing nozzle 55 such that there is a minimum disturbance of the transverse jet entraining fluid flow around coaxial blowing nozzle 55 or can cause to be produced a fluctuating pressure field to interact with to reinforce the fluctuating pressure field developed by the transverse jet and entraining fluid.

The FIG. 3 of the drawings is a top view of an enlarged detailed cross-section of a portion of FIG. 2 showing the coaxial blowing nozzle 55, the transverse jet 63 and the fluid or air deflection baffle 39. The molten glass 4 flows into the annular space 58 formed between coaxial nozzles 56 and 57 and is blown into an elongated cylindrical shape 62 by blowing gas 60. Blowing gas 60 flows through annular chamber 17 into the inner inlet portion of coaxial nozzle 56 and out of orifice 56a to blow and form elongated shaped cylinder 62.

Entraining fluid 64 flows through cylindrical chamber 16 into the inner inlet portion of extension 65 of transverse jet 63, through transverse jet 63 out of orifice 63a and is directed at coaxial blowing nozzle 55. The rotation of the centrifuge is from right to left in the drawing. During the operation of the centrifuge apparatus, the air or gas fluid between the peripheral wall of the rotor 1 and the stationary housing 2 that surrounds the rotor is deflected radially outward by deflection baffle 39 in a manner such that the flow of the transverse jet entraining fluid around the coaxial blowing nozzle 55 is not significantly disturbed or effected. Depending on the shape and dimensions and distance of the deflection baffle 39 from coaxial blowing nozzle 55, the deflection baffle can cause the fluid or gas flow to produce a fluctuating pressure field to interact with to reinforce the fluctuating pressure field developed by the transverse jet and entraining fluid.

The elongated cylinders 62 become attached from the coaxial blowing nozzle 55 to form spherical shaped hollow glass microspheres 67 and where a metal vapor is used as a blowing gas have deposited on the inner wall surface thereof a thin metal layer 70. The hollow glass microspheres 67 are initially thrown by centrifugal force radially outward towards the inner wall surface of the stationary housing 2.

The quench fluid spray which is directed downwardly and into contact with the hollow glass microspheres, in addition to rapidly cooling the microspheres, causes them to move downwardly along but of contact with the inner wall surface of stationary housing 2.

The FIG. 4a of the drawings illustrates a preferred embodiment of the invention in which the lower portion of the outer coaxial nozzle 57 is tapered inwardly at 71. This embodiment as in the previous embodiment comprises coaxial blowing nozzle 55 which consists of inner nozzle 56 with orifice 56a and outer nozzle 57 with orifice 57a'. The figure of the drawings also shows elongated cylinder shaped liquid film 62 with a pinched portion 66.

The use of the tapered nozzle 71 construction was found to substantially assist in the formation of a thin molten glass film 59' in the area between orifice 56a of inner nozzle 56 and orifice 57a' of outer nozzle 57. The inner wall surface 72 of the taper portion 71 of the outer nozzle 57 when pressure is applied to molten glass 4 forces the molten glass 4 to squeeze through a fine gap formed between the outer edge of orifice 56a, i.e. the outer edge of inner nozzle 56, and the inner surface 72 to form the thin molten glass film 59' across orifices 56a and 57a'. Thus, the formation of the molten film 59' does not in this embodiment rely solely on the surface tension properties or the molten glass.

The illustrated coaxial nozzle can be used to produce microspheres having diameters three to five times the size of the diameter of orifice 57a of coaxial nozzle 57 and allows making microspheres of smaller diameter than those made using the FIG. 3 apparatus and is particularly useful in blowing high viscosity glass material. However, with both the FIG. 3 and FIG. 4a coaxial blowing nozzles, it was found that the microspheres can be made even smaller by increasing the linear velocity of the transverse jet entraining fluid and larger by decreasing the linear velocity; and that as the point of intersect of a line drawn through the center axis of coaxial blowing nozzle 55 and a line drawn through the center axis of transverse jet 63 move radially outward towards the orifice 57a that the microspheres can be made smaller and as it was moved radially inward away from the orifice 57a the microspheres could be made larger.

The diameter of the microsphere is determined by the diameter of orifice 57a'. This apparatus allows the use of larger inner diameters of outer nozzle 57 and larger inner diameters of inner nozzle 56, both of which reduce the possibility of plugging of the coaxial nozzles when in use. These features are particularly advantageous when the blowing gas contains dispersed metal particles and/or the glass composition contains additive material particles.

The FIGS. 4a and 4b of the drawings illustrate another preferred embodiment of the invention in which the outer portion of the transverse jet 63 is flattened at 63b to form a generally rectangular or oval shaped orifice opening 63a. The orifice opening 63a can be disposed at an angle relative to a line drawn through the central axis of coaxial nozzle 55. The preferred angle, however, is that as illustrated in the drawing. That is, at an angle of about 90° to the central axis of the coaxial nozzle 55.

The use of the flattened transverse jet for entraining fluid 64 was found, at a given velocity, to concentrate the effect of the fluctuating pressure field and to increase the amplitude of the pressure fluctuations induced in the region of the formation of the hollow microspheres at the opposite or lee side of the blowing nozzle 55. By the use of the flattened transverse jet and increasing the amplitude of the pressure fluctuations, the pinching action exerted on the cylinder 62 is increased. This action facilitates the closing off of the cylinder 62 at its inner pinched end 66 and detaching of the cylinder 62 from the orifice 57a of the coaxial nozzle 57.

The FIG. 4c of the drawings illustrates another preferred embodiment of the present invention in which a high viscosity glass material is used to blow hollow glass filamented microspheres. In this Figure, the elongated shaped cylinder 62 and glass microspheres 67a, 67b and 67c are connected to each other by thin glass filaments 67d. As can be seen in the drawing, as the microspheres 67a, 67b and 67c progress away from blowing nozzle 55 surface tension forces act on the elongated cylinder 62 to effect the gradual change of the elongated shaped cylinder 62 to the generally spherical shape 67a, more spherical shape 67b and finally the spherical shape microsphere 67c. The same surface tension forces cause a gradual reduction in the diameter of the connecting filaments 67d, as the distance between the microspheres and filaments and the blowing nozzle 55 increases. The hollow glass microspheres 67a, 67b and 67c that are obtained are connected by thin filament portions 67d that are substantially of equal length and that are continuous with the glass microspheres.

The operation of the apparatus illustrated in FIGS. 4a, 4b and 4c is similar to that discussed above with regard to FIGS. 1, 2 and 3 of the drawings.

The entire centrifuge apparatus can be enclosed in a high pressure containment vessel, not shown, which allows the process to be carried out at elevated pressures.

INORGANIC FILM FORMING MATERIAL AND GLASS COMPOSITIONS

The inorganic film forming material and compositions and particularly the glass compositions from which the hollow glass microspheres of the present invention are made can be widely varied to obtain the desired physical characteristics for heating, blowing, forming, cooling and hardening the microspheres and the desired heat insulating strength, gas permeability and light transmission characteristics of the glass microspheres produced.

The glass compositions can be selected to have a low heat conductivity and sufficient strength when cooled and solidified to, when the microsphere contains a high vacuum, withstand atmospheric pressure. The molten glass composition forms hard microspheres which are capable of contacting adjacent microspheres without significant wear or deterioration at the points of contact and are resistant to deterioration from exposure to moisture, heat and/or weathering.

The constituents of the glass compositions can vary widely, depending on their intended use, and can included naturally occurring and synthetically produced glass materials.

The constituents of the glass compositions can be selected and blended to have high resistance to corrosive gaseous materials, high resistance to gaseous chemical agents, high resistance to alkali and weather, low susceptibility to diffusion of gaseous materials into and out of the glass microspheres, and to be substantially free of trapped gas bubbles or dissolved gases in the walls of the microspheres which can form bubbles and to have sufficient strength when cured, hardened and solidified to support a substantial amount of weight and/or to withstand a substantial amount of pressure.

The microspheres of the present invention are capable of contacting adjacent microspheres without significant wear or deterioration at the points of contact and are resistant to deterioration from exposure to moisture, heat and/or weathering.

The glass compositions preferably contain relatively large amounts of silicon dioxide, alumina, lithium, zirconia, and lime and relatively small amounts of soda. Calcium can be added to assist in melting the glass and boric oxide can be added to improve the weathering properties of the glass and to lower its viscosity. The glass compositions are formulated to have a relatively narrow temperature difference between the melting, i.e. fluid flow and hardening temperatures. The glass compositions are formulated such that they have a high rate of viscosity increase with decreasing temperature so that the microsphere walls will solidify, harden and strengthen before the blowing gas within the sphere decreases in volume and pressure a sufficient amount to cause the microsphere to collapse. Where it is desirous to maintain positive pressure or a high vacuum in the inner volume of the microspheres, the permeability to gases such as helium requires reduction of the network formers, such as silica, and the inclusion of network modifiers, such as alumina. Other means for decreasing the permeability of the hollow glass microspheres to gases are discussed below.

The use of glass compositions containing a relatively high alumina content and a relatively low soda content was found to produce a rapid hardening of the glass microspheres, which facilitated the production of glass microspheres and in particular glass microspheres having a high contained vacuum.

For certain uses relatively low temperature melting glass compositions, e.g. 1000° to 2200° F., preferably 1800° to 2000° F., can be used which allow the use of relatively low cost cobalt based alloys for the construction of the centrifuge apparatus, including the centrifuge rotor. The low melting glass compositions can contain relatively large amounts of lead or arsenic. Naturally occurring glass materials such as basaltic mineral compositions can also be used. The use of these naturally occurring glass compositions can in some cases substantially reduce the cost of the raw materials used.

Some of the glass compositions, including basaltic mineral compositions, suitable for use in the present invention are given in applicant's copending application Ser. No. 059,297, filed July 20, 1979, which information is incorporated herein by reference.

Other glass compositions having specific constituents of physical and chemical properties that can be used to carryout the present invention are disclosed in Morey, G. W. "The Properties of Glass", 2nd Edition, 1954 and Lynch, C. T. "Handbook of Material Science", Vol. II (Metals, Composites, and Refractory Materials).

The discussions in the present invention with respect to glass compositions is applicable to the various glass compositions mentioned including the naturally occurring basaltic mineral composition.

There may be added to the glass compositions chemical agents which effect the viscosity of the compositions in order to obtain the desired viscosities for blowing the microspheres.

To assist in the blowing and formation of the glass microspheres and the glass vacuum microspheres and to control the surface tension and viscosity of the spheres, suitable surface active agents, such as colloidal particles of insoluble substances, and viscosity stabilizers can be added to the glass composition as additives.

A distinct and advantageous feature of the present invention is that latent solid or latent liquid blowing gases are not used or required and that the microspheres that are produced are free of latent solid or latent liquid blowing gas materials or gases.

The glass compositions from which the hollow glass microspheres can be made are, depending on the particular glass materials used, to some degree permeable to the gas materials used to blow the microspheres and/or to the gases present in the medium surrounding the microspheres. The gas permeability of the glass compositions can be controlled, modified and/or reduced or substantially eliminated by the addition, prior to blowing the microspheres, to the glass composition of very small inert laminar plane-orientable additive material particles. When any one or more of these laminar plane-orientable additive material particles are added to a glass composition prior to the blowing and formation of the hollow glass microsphere, the process of making the microsphere aligns the laminar particles, as the glass film is stretched in passing, i.e. extruded, through the conical blowing nozzle, with the walls of the hollow glass microsphere and normal to the gas diffusion direction. The presence of the laminar plane particles in the microsphere walls substantially diminishes the gas permeability of the glass film. The sizes of the additive particles are advantageously selected to be less than one-half the thickness of the wall of the microspheres.

The centrifuge apparatus and method of the present invention can also be used to make hollow microspheres from the organic film forming materials and particularly the plastic materials using the process conditions disclosed in applicant's copending application Ser. No. 059,296, filed July 20, 1979, which disclosure is incorporated by reference herein in its entirety.

The operating temperatures and conditions used to make hollow microspheres from organic film forming materials, particularly plastic materials disclosed in applicant's copending application, can be used with the centrifuge apparatus and method of the present invention.

BLOWING GAS

The hollow microspheres and particularly the glass microspheres can be blown with a gas, an inert gas, an inert metal vapor or gas containing dispersed metal particles or mixtures thereof. The microspheres can be used to make insulating materials and/or filler materials.

The inert gases used to blow the microspheres are selected to have a low heat conductivity and generally involve heavy molecules which do not transfer heat readily. Suitable blowing gases are argon, xenon, carbon dioxide, nitrogen, nitrogen dioxide, sulfur and sulfur dioxide. Organo metal compounds can also be used as a blowing gas. The blowing gas is selected to have the desired internal pressure when cooled to ambient temperatures. When sulfur, for example, is used as a blowing gas, the sulfur condenses and a partial vacuum can be formed in the microsphere.

Blowing gases can also be selected that react with the inorganic film forming material or composition, e.g. the glass microspheres, for example, to assist in the hardening of the microspheres or to make the microsphere less permeable to the contained blowing gases. The blowing gases can also be selected to react with the deposited thin metal layer to obtain desired characteristics in the metal layer. For example, to reduce the thermal conductivity of the metal layer. For certain uses, oxygen or air can be used as or added to the blowing gas.

The metal vapor is used as a blowing gas to obtain a substantial vacuum in the contained volume of the microsphere and to deposit a thin metal coating on the inner wall surface of the hollow glass microsphere. The specific metal used as well as the thickness and nature of metal coating deposited will determine whether the metal coating is transparent or reflective or visible light.

The metal vapor used to blow the hollow glass microspheres is selected to have the desired vaporization temperature, latent heat capacity and vapor pressure at the blowing temperature, and to have the desired vapor pressure at the solidification temperature and ambient temperature. The condensing and depositing of the metal vapor within the hollow glass microsphere produces a vapor pressure equivalent to the vapor pressure of the metal at room temperature, i.e. about zero vapor pressure. The thickness of the deposited metal coating will depend to some extent upon the metal vapor pressure used to blow the microsphere, the size of the microsphere and the temperature of the molten glass.

Small amounts of metal vapors, e.g. alkali metals, that act as gettering materials can be added to the metal vapor blowing gas. The gettering materials react with gases evolved from the molten glass film during the formation of the microspheres and maintain the hard contained vacuum.

The metal vapor blowing gases such as zinc, antimony, barium, cadmium, cesium, bismuth, selenium, lithium, magnesium, and potassium can be used. Zinc and selenium, however, are preferred and zinc is particularly preferred.

An auxiliary blowing gas, e.g. an inert blowing gas can advantageously be used in combination with a metal vapor blowing gas to assist in the control of the cooling and solidification of the hollow molten glass microsphere. The auxiliary blowing gas accomplishes this purpose by maintaining the partial pressure of the auxiliary blowing gas in the microsphere for a sufficient period of time to allow the molten glass microsphere to solidify, harden and strengthen while the metal vapor is being condensed and the metal vapor pressure is substantially reduced. That is, the pressure drop of the blowing gas is slowed and a slightly lower vacuum is formed in the microsphere.

A blowing gas containing dispersed metal particles can be used to obtain in the contained volume of the microsphere a deposit of a thin metal coating on the inner wall surface of the hollow glass microsphere. The thickness of metal coating deposited will determine whether the metal coating is transparent or reflective of visible light.

The metal used to coat the inner wall surface of the hollow glass microspheres is selected to have the desired emissivity, low heat conduction characteristics, and to adhere to the inner wall surface of the glass microspheres. The thickness of the deposited metal coating will depend to some extent upon the metal, the particle size of the metal used, the size of the microspheres and the amount of dispersed metal particles used.

The dispersed metal particles size can be 25 Å to 10,000 Å, preferably 50 Å to 5,000 Å and more preferably 100 Å to 1,000 Å. A sufficient amount of the metal is dispersed in the blowing gas to obtain the desired thickness of the deposited metal. The dispersed metal particles can advantageously be provided with an electrostatic charge to assist in depositing them on the inner wall surface of the microspheres.

Metal particles such as aluminum, silver, nickel, zinc, antimony, barium, cadmium, cesium, bismuth, selenium, lithium, magnesium, potassium, and gold can be used. Aluminum, zinc and nickel, however, are preferred. Dispersed metal oxide particles can in a similar manner be used to obtain similar effect to that of the metals. In addition, the metal oxide particles can be used to produce a deposited film of lower heat conductivity characteristics.

The thin metal coating can also be deposited on the inner wall surface of the microsphere by using as or with the blowing gas, organo metal compounds that are gases at the blowing temperatures. Of the organo metal compounds available, the organo carbonyl compounds are preferred. Suitable organo metal carbonyl compounds are nickel and iron.

The organo metal compounds can be decomposed by heating just prior to blowing the microspheres to obtain finely dispersed metal particles and a decomposition gas. The decomposition gas, if present, can be used to assist in blowing the microspheres. The dispersed metal particles from decomposition of the organo metal compound, as before, deposit to form the thin metal layer. Alternatively, the microsphere, after being formed and containing the gaseous organo metal compound blowing gas, can be subjected to an "electric discharge" means which decomposes the organo metal compound to form the finely dispersed metal particles and the decomposition gas.

The thickness of the deposited metal layer will depend primarily on the partial pressure of the gaseous organo metal blowing gas and the inside diameter of the microsphere.

An auxiliary blowing gas can be used to dilute the gaseous organo metal compound blowing gas in order to control the thickness of the deposited metal layer. There can also be used as an auxiliary blowing gas, a gas that acts as a catalyst for the decomposition of the organo metal compound or as a hardening agent for the glass compositions. The addition of the catalyst or hardening agent to the blowing gas prevents contact of the catalyst with the organo metal compound or the hardening agent with the glass composition until a time just before the microsphere is formed.

The centrifuge apparatus and process of the present invention can also be used to encapsulate at high pressures the gaseous material blowing gases using the process conditions disclosed in applicant's copending application Ser. No. 069,295, filed Aug. 24, 1979, which disclosure is incorporated herein by reference in its entirety.

The entraining fluid can be a gas at a high or low temperature and can be selected to react with or be inert to the glass composition. The entraining fluid, e.g. an inert entraining fluid, can be a high temperature gas. Suitable entraining fluids are nitrogen, air, steam and argon.

An important feature of the present invention is the use of the transverse jet to direct the inert entraining fluid over and around the coaxial blowing nozzle. The entraining fluid assists in the formation and detaching of the hollow molten glass microsphere from the coaxial blowing nozzle.

The quench fluid can be a liquid, a liquid dispersion or a gas. Suitable quench fluids are steam, a fine water spray, air, nitrogen or mixtures thereof.

The inert quench fluid can be ethylene glycol vapor or liquid, steam, a fine water spray, or mixtures thereof. The hollow molten glass microspheres immediately after they are formed are rapidly quenched and cooled to solidify, harden and strengthen the glass microspheres before the internal gas pressure is reduced to such a low value that the microsphere collapses. The selection of a specific quench fluid and quench temperature depends to some extent on the glass composition from which the microsphere was formed and on the blowing gas or metal vapor used to blow the microsphere and on the metal and nature of the deposited metal film desired.

PROCESS CONDITIONS

The inorganic film forming materials and/or compositions of the present invention are heated to a temperature of about 1000° to 3100° F., preferably 1800° to 2800° F. and maintained in a liquid, fluid form at the desired blowing temperature during the blowing operation. The glass composition is heated to a temperature of 2000° to 2800° F., preferably 2300° to 2750° F. and more preferably 2400° to 2700° F., depending on the constituents of the composition. The low temperature glass compositions are heated to a temperature of 1800° to 2000° F. and up to 2200° F. The lead containing glass compositions can be heated to a temperature of about 1800° to 2900° F. The basaltic mineral glass compositions can be heated to a temperature of, for example, about 2100° to 3100° F.

The glass compositions at these temperatures, i.e. the blowing temperatures, is molten, fluid and flows easily. The molten glass just prior to the blowing operation has a viscosity of 10 to 600 poises, preferably 20 to 350, and more preferably 30 to 200 poises. The molten lead containing glass compositions just prior to the blowing operation have a viscosity of, for example, 10 to 500 poises. The molten basaltic mineral glass composition just prior to the blowing operation can have a viscosity of, for example, 15 to 400 poises.

Where the process is used to make non-filamented microspheres, the liquid glass just prior to the blowing operation can have a viscosity of 10 to 200 poises, preferably 20 to 100 poises, and more preferably 25 to 75 poises.

Where the process is used to make filamented microspheres, the liquid glass just prior to the blowing operation can have a viscosity of 50 to 600 poises, preferably 100 to 400 poises, and more preferably 150 to 300 poises.

A critical feature of the present invention is that the formation of the hollow glass microspheres can be carried out at low viscosities relative to the viscosities heretofore used in the prior art processes that utilized latent liquid or solid blowing agents dispersed throughout or contained in the glass compositions used to blow the microspheres. Because of the ability to utilize comparatively low viscosities, applicant is able to obtain hollow glass microspheres, the wall of which are free of any entrapped or dissolved gases or bubbles. With the low viscosities used by applicant, any entrapped or dissolved gases diffuse out and escape from the glass film surface during the bubble formation. With the high viscosities required to be used in the prior art processes, any dissolved gases are trapped in the walls of the glass microspheres as they are formed because of the high viscosities required to be used.

The glass during the blowing operation exhibits a surface tension of 150 to 400 dynes/cm, preferably 200 to 350 dynes/cm and more preferably 250 to 325 dynes/cm.

The pressure of molten or liquid glass fed to the coaxial blowing nozzle is provided by the centrifugal forces applied to the molten glass by the rotary motion of the centrifuge rotor.

The centrifuge can be operated at 100 to 3000 RPM, preferably 800 to 2000 RPM and more preferably 1000 to 1500 RPM. The centrifuge rotor can have a diameter of 8 to 30 inches, preferably 10 to 24 inches and more preferably 12 to 18 inches.

Depending on the diameter of the centrifuge rotor and the RPM at which the centrifuge is operated, the molten glass fed to the coaxial blowing nozzle can be at about ambient pressure or can be at an elevated pressure. The molten glass fed to the coaxial blowing nozzle due to the centrifugal force can be 1 to 200 p.s.i.g., preferably 3 to 100 p.s.i.g. and more preferably 5 to 50 p.s.i.g.

The total pressure of the molten or liquid glass feed can be at a pressure of 1 to 20,000 p.s.i.g., usually 3 to 10,000 p.s.i.g. and more usually 5 to 5,000 p.s.i.g. The molten glass feed when used for low pressure applications can be at a pressure of 1 to 1000 p.s.i.g., preferably 3 to 500 p.s.i.g. and more preferably 5 to 100 p.s.i.g.

Where the process is used to make microspheres for use as insulating materials and in insulating systems, or for use in syntactic foam systems and as filler materials in general, the liquid glass fed to the centrifuge apparatus coaxial blowing nozzle can also be at a pressure of 1 to 1,000 p.s.i.g., preferably at 3 to 100 p.s.i.g., and more preferably at 5 to 50 p.s.i.g. When it is desired that the molten glass fed to the coaxial blowing nozzle be at pressures above that developed by the centrifugal force of the centrifuge, than the entire centrifuge apparatus can be enclosed in a pressurized containment vessel and the vessel pressurized to the desired pressure.

The molten glass is continuously fed to the coaxial blowing nozzle during the blowing operation to prevent premature breaking and detaching of the elongated cylinder shaped molten glass liquid film as it is being formed by the blowing gas.

The blowing gas, inert blowing gas, gaseous material blowing gas or metal vapor will be at about the same temperature as the molten glass being blown. The blowing gas temperature can, however, be at a higher temperature than the molten glass to assist in maintaining the fluidity of the hollow molten glass microsphere during the blowing operation or can be at a lower temperature than the molten glass to assist in the solidification and hardening of the hollow molten glass microsphere as it is formed. The pressure of the blowing gas is sufficient to blow the microsphere and will be slightly above the pressure of molten glass at the orifice 57a of the outer nozzle 57. The blowing gas pressure will also depend on and be slightly above the ambient pressure external to the blowing nozzle.

The temperatures of the blowing gases will depend on the blowing gas used and the viscosity-temperature-shear relationship for the glass materials used to make the microspheres.

The metal vapor blowing gas temperature will be sufficient to vaporize the metal and will be at about the same temperature as the molten glass being blown. The metal vapor blowing gas temperature can, however, be at a higher temperature than the molten glass to assist in maintaining the fluidity of the hollow molten glass microsphere during the blowing operation or can be at a lower temperature than the molten glass to assist in the solidification and hardening of the hollow molten glass microsphere as it is formed. The pressure of the metal vapor blowing gas is sufficient to blow the microsphere and will be slightly above the pressure of molten glass at the orifice 57a of the outer nozzle 57. The metal vapor blowing gas pressure will also depend on and be slightly above the ambient pressure external to the blowing nozzle.

The pressure of the blowing gas or gaseous material blowing gas, including the metal vapor blowing gas, is sufficient to blow the microsphere and will be slightly above the pressure of liquid glass at the orifice 57a of the outer nozzle 57. Depending on the gaseous material to be encapsulated with the hollow glass microspheres, the blowing gas or the gaseous material can be at a pressure of 1 to 20,000 p.s.i.g., usually 3 to 10,000 p.s.i.g. and more usually 5 to 5,000 p.s.i.g.

The blowing gas or gaseous material blowing gas can also be at a pressure of 1 to 1,000 p.s.i.g., preferably 3 to 500 p.s.i.g. and more preferably 5 to 100 p.s.i.g.

Where the process is used to make microspheres for use as insulating materials and in insulating systems, for use in syntactic foam systems and as filler materials in general, the blowing gas or gaseous material blowing gas can be at a pressure of 1 to 1,000 p.s.i.g., preferably at 3 to 100 p.s.i.g. and more preferably at 5 to 50 p.s.i.g.

The pressure of the blowing gas containing dispersed metal particles alone and/or in combination with the principle blowing gas is sufficient to blow the microsphere and the combined gas pressure will be slightly above the pressure of the liquid glass at the orifice 57a of the outer nozzle 57. The pressure of the combined mixture of the blowing gases will also depend on and be slightly above the ambient pressure external to the blowing nozzle.

The ambient pressure external to the blowing nozzle can be at about atmospheric pressure or can be at subatmospheric or superatmospheric pressure. Where it is desired to have a relatively or high pressure of contained gas in the microsphere or to deposit a relatively thick coating of metal within a vacuum microsphere, the ambient pressure external to the blowing nozzle is maintained at a superatmospheric pressure. The ambient pressure external to the blowing nozzle will, in any event, be such that it substantially balances, but is slightly less than the blowing gas pressure.

The transverse jet inert entraining fluid which is directed over and around the coaxial blowing nozzle to assist in the formation and detaching of the hollow molten glass microsphere from the coaxial blowing nozzle can be at about the temperature of the molten glass being blown. The entraining fluid can, however, be at a higher temperature than the molten glass to assist in maintaining the fluidity of the hollow molten glass microsphere during the blowing operation or can be at a lower temperature than the molten glass to assist in the stabilization of the forming film and the solidification and hardening of the hollow molten glass microsphere as it is formed.

The transverse jet entraining fluid which is directed over and around the coaxial blowing nozzle to assist in the formation and detaching of the hollow liquid glass microsphere from the coaxial blowing nozzle can have a linear velocity in the region of microsphere formation of 1 to 120 ft/sec, usually 5 to 80 ft/sec and more usually 10 to 60 ft/sec.

Where the process is used to make non-filamented microspheres, the linear velocity of the transverse jet fluid in the region of microsphere formation can be 30 to 120 ft/sec, preferably 40 to 100 ft/sec and more preferably 50 to 80 ft/sec.

Where the process is used to make filamented microspheres, the linear velocity of the transverse jet fluid in the region of microsphere formation can be 1 to 50 ft/sec, preferably 5 to 40 ft/sec and more preferably 10 to 30 ft/sec.

It was found that operating under conditions where microspheres were being formed that while maintaining those operating conditions and increasing the transverse jet entraining fluid linear velocity that the diameter of the hollow microsphere decreased, and that under the same operating conditions decreasing the transverse jet entraining fluid linear velocity that the diameter of the hollow microsphere was increased.

Further, it is found (FIGS. 3 and 4) that pulsing the transverse jet entraining fluid at a rate of 2 to 1500 pulses/sec, preferably 50 to 1000 pulses/sec and more preferably 100 to 500 pulses/sec assists in controlling the diameter of the microspheres and the length of the filament portion of the filamented microspheres and detaching the microspheres from the coaxial blowing nozzle.

The distance between filamented microspheres depends to some extent on the viscosity of the glass and the linear velocity of the transverse jet entraining fluid.

The entraining fluid can be at the same temperature as the liquid glass being blown. The entraining fluid can, however, be at a higher temperature than the liquid glass to assist in maintaining the fluidity of the hollow liquid glass microsphere during the blowing operation or can be at a lower temperature than the liquid glass to assist in the stabilization of the forming film and the solidification and hardening of the hollow liquid glass microsphere as it is formed.

The quench fluid is at a temperature such that it rapidly cools the hollow molten glass microsphere to solidify, harden and strengthen the molten glass before the inner gas pressure or metal vapor pressure decreases to a value at which the glass microsphere would collapse. The quench fluid can be at a temperature of 0° to 200° F., preferably 40° to 200° F. and more preferably 50° to 100° F. depending to some extent on the glass composition.

The quench fluid very rapidly cools the outer molten glass surface of the microsphere with which it is in direct contact and more slowly cools the blowing gas or metal vapor enclosed within the microsphere because of the lower thermal conductivity of the gas or vapor. This cooling process allows sufficient time for the glass walls of the microspheres to strengthen before the gas is cooled or the metal vapor is cooled and condensed and a high vacuum formed within the glass microsphere.

The cooling and deposition of the metal vapor on the inner wall surface of the microspheres can be controlled to optimize the crystal size of the metal deposited such that sufficiently large crystals are obtained that the deposited metal film is discontinuous. The discontinuities in the metal film reduce the thermal conductivity of the metal film while at the same time retaining the metal films ability to reflect radiant heat.

The time elapsed from commencement of the blowing of the glass microspheres to the cooling and hardening of the microspheres can be 0.0001 to 1.0 second, preferably 0.0010 to 0.50 second and more preferably 0.010 to 0.10 second.

The filamented microsphere embodiment of the invention provides a means by which the microspheres may be suspended and allowed to harden and strengthen without being brought into contact with any surface. The filamented microspheres are simply drawn on a blanket or drum and are suspended between the blowing nozzle and the blanket or drum for a sufficient period of time for them to harden and strengthen.

The microspheres and filamented microspheres may be collected in the manner disclosed in Kleist U.S. Pat. No. 3,865,566.

APPARATUS

Referring to FIGS. 1, 2 and 3 of the drawings, the molten glass 4 is heated by means not shown to maintain the molten glass 4 at the desired operating temperatures and fed from reservoir 5 through feed opening 6 and annular space 7 to the centrifuge rotor 1. The molten glass 4 is fed to the rotor 1 and the coaxial blowing nozzle 55. The coaxial blowing nozzle 55 consists of an inner nozzle 56 having an outside diameter of 0.32 to 0.010 inch, preferably 0.20 to 0.015 inch and more preferably 0.10 to 0.20 inch and an outer nozzle 57 having an inside diameter of 0.420 to 0.020 inch, preferably 0.260 to 0.025 inch and more preferably 0.130 to 0.030 inch. The inner nozzle 56 and outer nozzle 57 form annular space 58 which provides a flow path through which the molten glass 4 is extruded. The distance between the inner nozzle 56 and outer nozzle 57 can be 0.050 to 0.004, preferably 0.030 to 0.005 and more preferably 0.015 to 0.008 inch.

The orifice 56a of inner nozzle 56 terminates a short distance above the plane of orifice 57a of outer nozzle 57. The orifice 56a can be spaced above orifice 57a at a distance of 0.001 to 0.125 inch, preferably 0.002 to 0.050 inch and more preferably 0.003 to 0.025 inch. The molten glass 4 flows by centrifugal force developed by the rotation of rotor 1 and flows outwardly and is extruded through annular space 58 and fills the area between orifices 56a and 57a. The surface tension forces in the molten glass 4 form a thin liquid molten glass film 59 across orifices 56a and 57a which has about the same or a smaller thickness as the distance of orifice 56a is spaced inward of orifice 57a. The orifices 56a and 57a can be made from cobalt based alloys, stainless steel, platinum alloys or fused alumina. Platinum alloys are, however, preferred. The surface tension forces in the liquid glass 4 form a thin liquid glass film 59 across orifices 56a and 57a which has about the same or a smaller thickness as the distance of orifice 56a is spaced inward of orifice 57a. The molten glass film 59 can be 25 to 3175 microns, preferably 50 to 1270 microns and more preferably 76 to 635 microns thick.

The FIG. 3 blowing nozzle can be used to blow molten glass at relatively low viscosities, for example, of 10 to 60 poises, and to blow hollow glass microspheres of relatively thick wall size, for example, of 20 to 100 microns or more.

A blowing gas, inert blowing gas, gaseous material blowing gas or metal vapor blowing gas is fed through inner coaxial nozzle 56 and brought into contact with the inner surface of molten glass film 59. The inert blowing gas exerts a positive pressure on the molten glass film to blow the film which in combination with the centrifugal force distends the film outwardly to form an elongated cylinder shaped liquid film 62 of molten glass filled with the blowing gas 60. The elongated cylinder 62 is closed at its outer end and is connected to outer nozzle 57 at the peripheral edge of orifice 57a.

The transverse jet 63 is used to direct an inert entraining fluid 64 through nozzle 63 and transverse jet nozzle orifice 63a at the coaxial blowing nozzle 55. The coaxial blowing nozzle 55 has an outer diameter of 0.52 to 0.030 inch, preferably 0.36 to 0.035 inch and more preferably 0.140 to 0.040 inch.

The process of the present invention was found to be very sensitive to the distance of the transverse jet 63 from the orifice 57a of outer nozzle 57, the angle at which the transverse jet was directed at coaxial blowing nozzle 55 and the point at which a line drawn through the center axis of transverse jet 63 intersected with a line drawn through the center axis of coaxial nozzle 55. The transverse jet 63 is aligned to direct the flow of entraining fluid 64 over and around outer nozzle 57 in the microsphere forming region of the orifice 57*a*. The orifice 63*a* of transverse jet 63 is located a distance of 0.5 to 14 times, preferably 1 to 10 times and more preferably 1.5 to 8 times and still more preferably 1.5 to 4 times the outside diameter of coaxial blowing nozzle 55 away from the point of intersect of a line drawn along the center axis of transverse jet 63 and a line drawn along the center axis of coaxial blowing nozzle 55. The center axis of transverse jet 63 is aligned at an angle of 15° to 85°, preferably 25° to 75° and more preferably 35° to 55° relative to the center axis of the coaxial blowing nozzle 55. The orifice 63*a* can be circular in shape and have an inside diameter of 0.32 to 0.010 inch, preferably 0.20 to 0.015 inch and more preferably 0.10 to 0.020 inch.

The line drawn through the center axis of transverse jet 63 intersects the line drawn through the center axis of coaxial blowing nozzle 55 at a point radially inward of the orifice 57*a* of outer nozzle 57 which is 0.5 to 4 and up to 6 times, preferably 1.0 to 3.5 times and more preferably 2 to 3 times the outside diameter of the coaxial blowing nozzle 55. The transverse jet entraining fluid acts on the elongated shaped cylinder 62 to flap and pinch it closed and in combination with the centrifugal force detach it from the orifice 57*a* of the outer nozzle 57 to allow the cylinder to be transported away from the outer nozzle 57 by the entraining fluid. It was found that when operating conditions where microspheres are being formed that as the point of intersect of the line drawn through the transverse jet (at the same angle) to the center axis of the coaxial blowing nozzle 55 was moved radially inward from the orifice 57*a* that the diameter of the hollow glass microsphere was increased, and when the point of intersect was moved radially outward the diameter of the hollow glass microsphere was decreased.

The transverse jet entraining fluid 64 as it passes over and around the blowing nozzle fluid dynamically induces a periodic pulsating or fluctuating pressure field at the opposite or lee side of the blowing nozzle in the wake or shadow of the coaxial blowing nozzle. A similar periodic pulsating or fluctuating pressure field can be produced by a pulsating sonic pressure field directed at the coaxial blowing nozzle. The entraining fluid assists in the formation and detaching of the hollow glass microsphere from the coaxial blowing nozzle. The use of the transverse jet and entraining fluid in the manner described also discourages wetting of the outer wall surface of the coaxial blowing nozzle 55 by the molten glass being blown. The wetting of the outer wall disrupts and interfers with blowing the microspheres.

Also, the shape, dimensions and position relative to the coaxial blowing nozzle of the fluid or air deflection baffle can be adjusted so that it sheds a periodic wake in the vicinity of the microsphere formation, thereby interacting with to reinforce the pressure fluctuations produced by the action of the transverse jet entraining fluid on the developing hollow microsphere.

The quench nozzles 68 are radially disposed away from and circumferentially about the periphery of the rotor 1 and above the coaxial blowing nozzle 55 a sufficient distance to direct the quench fluid downward and in a direction transverse to the direction of rotation of rotor 1. The downward direction of flow of the quench fluid changes the direction of movement of the microspheres in a manner such that they flow downwardly along but out of contact with the inner wall surface of the stationary housing 2 into a collection chamber, not shown.

The inside diameter of quench nozzle orifice 68*a* can be 0.1 to 0.75 inch, preferably 0.2 to 0.6 inch and more preferably 0.3 to 0.5 inch. The quench nozzles 68 direct cooling fluid 69 at and into contact with the molten glass microspheres 67 at a velocity of 2 to 14, preferably 3 to 10 and more preferably 4 to 8 ft/sec to rapidly cool and solidify the molten glass and form a hard, smooth hollow glass microsphere.

The rotor 1 and molten glass 4 spread evenly on the inner surface of wall 20 of rotor 1 are maintained at the desired operating temperatures by conventional combustion and/or radiant gas burners not shown. Radiant resistant or induction heaters can also be used, if desired.

The centrifuge apparatus rotor 1 and related parts are carried on and rotate with center post 22. The first and second concentric shells and rotor 1 can be welded or removeably connected as desired to center post 23.

The center post 23 is mounted for rotation on bearing means not shown and is driven in a conventional manner by a suitable drive means also not shown.

Openings 44 are provided in the centrifuge housing 2 to allow passage of additional quench fluid or a carrier fluid or gas 43 for the hollow microspheres 67. The carrier fluid or gas can be heated or cooled and/or can be directionally supplied by a direction nozzle means not shown.

The carrier fluid or gas 43 allows operating flexibility and means by which a fluid flow independent of the quench fluid 69 can be provided to assists in carrying the microspheres away from the rotor 1 and prevent and/or minimize contact of the microspheres with the inner wall surface of the housing 2.

The metal alloy from which the centrifuge rotor is made, the molten glass temperature and the RPM at which the rotor rotates are all important operating parameters.

The metal alloy compositions must be such that at the operating temperatures and RPM's metal creep is minimized. Suitable cobalt based alloy compositions for operating at temperatures up to 2200° F. and RPM's up to 3000 are known and used to make fiberglass.

The FIG. 3 of the drawings is an enlarged portion of the centrifuge apparatus illustrated in FIG. 2 showing in detail a top view of the coaxial blowing nozzle 55, the transverse jet 63 and the deflection baffle 39.

The coaxial nozzle 57 is carried on peripheral wall 20 and extends through wall 20. The inner portion of coaxial nozzle 56 can terminate at the inner surface of peripheral wall 20 or can extend a short distance inward past the inner surface of wall 20. The extent by which the inner portion of coaxial nozzle 56 extends inward can be controlled and used to control or adjust the height "H" of the molten glass layer 4. The coaxial nozzle 56 can be screw threaded into peripheral wall 20, can be welded to or on the outer peripheral wall 20 or cast and formed with the rotor 1.

The coaxial nozzle 57 is carried on wall 14 of second concentric shell 12 and extends through wall 20. Concentric shell 12 comprises outer wall 13, upper wall 14 and lower wall 15. The inner portion of coaxial nozzle 56 can terminate at the inner surface of wall 14 or can extend a short distance inwardly past the inner surface of wall 14. The coaxial nozzle 56 can be screw threaded into peripheral wall 20, can be welded or screwed to wall 14.

In the embodiment shown in FIG. 4a of the drawings where coaxial nozzle 57 has a tapered end, the coaxial nozzle 56 can be pressure sealed to wall 14 of second concentric shell 12 and be allowed to "float" in the molten glass 4 in annular space 58 between coaxial nozzle 56 and coaxial nozzle 57. In this embodiment, the narrow opening between coaxial nozzle 56 and the tapered portion of coaxial nozzle 57 will in part be determined by the centrifugal force applied to the "floating" coaxial nozzle 57. Spacer ridges, however, can be provided in the tapered portion of coaxial nozzle 57 to set the size of the narrow opening.

The transverse jet 63 has an inner extension portion 65. The transverse jet is carried on peripheral wall 20 of rotor 1 and extends through wall 20. The inner portion 65 of transverse jet 63 can terminate at the inner surface of outer wall 10 of first concentric shell 8 or can extend a short distance inward past the inner surface of wall 10. The first concentric shell 8 comprises upper wall 9, outer wall 10 and lower wall 11. The transverse jet 63 can be screw threaded into peripheral wall 20, or can be welded to or on the outer peripheral wall 20. The portion of transverse jet 63 or the extension 65 of transverse jet 63 passing through wall 14 of second concentric shell 12 and wall 10 of first concentric shell 8 can be provided with gas sealing means which would allow the first and second concentric shells to expand or contract around transverse jet 63 or can be welded thereto.

The gas seal means also allows the transverse jets to be replaced without taking the centrifugal apart to do so. This allows changing the angle of the transverse jet relative to the coaxial blowing nozzle 55 and the distance of the transverse jet orifice 63a away from the coaxial blowing nozzle 55.

The deflection baffle 39 is made of a suitable alloy material to withstand the operating temperatures and conditions used to make the hollow microspheres. The deflection baffle can be welded or screwed to the peripheral wall 20 of the rotor 1 or can be cast with the rotor 1. The height of the deflection baffle and its distance from the coaxial blowing nozzle are selected such that the flow characteristics of the air or fluid flow 40 of the ambient atmosphere in the microsphere forming region of coaxial nozzle 55 is controlled so as to not adversely affect the microsphere formation but to rather enhance the periodic pressure fluctuations and the microsphere formation.

In another embodiment of the invention, the coaxial blowing nozzle 55 can be away from the direction of rotation of the centrifuge. The coaxial blowing nozzle can be tilted away from the direction of rotation of the centrifuge by an amount of angle "a" which can be 0° to 60°, preferably 5° to 45° and more preferably 10° to 30° relative to a line drawn through the center axis of coaxial blowing nozzle 55 which is normal to a tangent to the surface of peripheral wall 20 of rotor 1. This embodiment of the invention is used in combination with the deflection baffle 39 to produce in the region of microsphere formation a pulsating or fluctuating pressure field having period oscillations which acts on the microspheres to assist in their formation and to assist in detaching them from the orifice of coaxial nozzle 55.

The most preferred embodiment of the invention is one in which the coaxial nozzle 55 is normal to a tangent to the surface of wall 20 of the rotor 1.

The centrifugal force provided by rotation of rotor 1 assists in distending of the glass film across orifice 59 during the initial formation of the microspheres and subsequently in detaching the microspheres from coaxial nozzle 55 and in certain instances the fluid flow of the ambient atmosphere can assist in detaching the microspheres from coaxial nozzle 55.

The FIG. 4a of the drawings illustrates a preferred embodiment of the invention. It was found that in blowing molten glass compositions at high viscosities that it was advantageous to immediately prior to blowing the molten glass to provide by extrusion a very thin molten glass liquid film for blowing into the elongated cylinder shape liquid film 62. The thin molten glass liquid film 59' is provided by having the lower portion of the outer coaxial nozzle 57 tapered inwardly at 71. The tapered portion 71 and inner wall surface 72 thereof can be at an angle of 15° to 75°, preferably 30° to 60° and more preferably about 45° relative to the center axis of coaxial blowing nozzle 55. The orifice 57' can be 0.10 to 1.5 times, preferably 0.20 to 1.1 times and more preferably 0.25 to 0.8 times the inner diameter of orifice 56a of inner nozzle 56.

The thickness of the molten glass liquid film 59' can be varied by adjusting the distance of orifice 56a of inner nozzle 56 above orifice 57a of outer nozzle 57 such that the distance between the peripheral edge of orifice 56a and the inner wall surface 72 of tapered nozzle 71 can be varied. By controlling the distance between the peripheral edge of orifice 56a and the inner wall surface 72 of the tapered nozzle to form a very fine gap and by controlling the pressure applied to feed the molten glass 4 through annular space 58 the molten glass 4 can be squeezed or extruded through the very fine gap to form a relatively thin molten glass liquid film 59'.

The proper gap can best be determined by pressing the inner coaxial nozzle 56 downward with sufficient pressure to completely block-off the flow of glass, and to then very slowly raise the inner coaxial nozzle 56 until a stable system is obtained, i.e. until the microspheres are being formed. Alternatively, spacer ridges can be provided on tapered portion 72 or on the outer edge of orifice 56a to set the gap. Spacer ridges can also be provided between coaxial nozzles 56 and 57 to center coaxial nozzle 56 within coaxial nozzle 57 to maintain through-out its length uniform annular space 58.

The tapered nozzle construction illustrated in FIG. 4a is as mentioned above the preferred embodiment of the invention. This embodiment can be used to blow glass compositions at relatively high viscosities as well as to blow glass compositions at the relatively low viscosities referred to with regard to FIG. 3 of the drawings. The FIG. 4a embodiment of the invention is of particular advantage in blowing thin walled microspheres for use in or as insulating materials.

When blowing high or low viscosity glass compositions, it was found to be advantageous to obtain the very thin molten glass fluid film and to continue during the blowing operation to supply molten glass to the elongated cylinder shaped liquid film as it was formed. Where a relatively high centrifugal force, i.e. a high pressure is used to squeeze, i.e. extrude, the molten glass through the very thin gap, the pressure of the inert blowing gas or metal vapor is generally slightly above the pressure of the molten glass at the coaxial blowing nozzle.

The tapered nozzle configuration of FIG. 4a is also particularly useful in aligning the laminar plane-orientable glass additive materials. The passage of the glass material through the fine or narrow gap serves to align the additive materials with the walls of the microspheres as the microspheres are being formed.

The FIGS. 4a and 4b of the drawings also illustrate a preferred embodiment of the invention in which the transverse jet 63 is flattened to form a generally rectangular or oval shape. The orifice 63a can also be flattened to form a generally rectangular or oval shape. The width of the orifice can be 0.96 to 0.030 inch, preferably 0.60 to 0.045 inch and more preferably 0.030 to 0.060 inch. The height of the orifice can be 0.32 to 0.010 inch, preferably 0.20 to 0.015 inch and more preferably 0.10 to 0.020 inch.

With reference to FIG. 4c of the drawings which illustrates an embodiment of the present invention in which a high viscosity glass material or composition is used to blow filamented hollow glass microspheres, there is shown the formation of the uniform diameter microspheres spaced out equal distances apart. The numbered items in this drawing have the same meanings as discussed above with reference to the Figures of the drawings.

DESCRIPTION OF THE MICROSPHERES

The hollow microspheres made in accordance with the present invention can be made from a wide variety of film forming materials and compositions, particularly glass compositions.

The film forming compositions can be the inorganic film forming compositions disclosed in the above-mentioned copending application Ser. No. 059,297 or the organic film forming compositions disclosed in the above-mentioned copending application Ser. No. 059,296.

The hollow microspheres made in accordance with the present invention can be made from suitable inorganic film forming, e.g. glass, compositions. The compositions are preferably resistant to high temperatures and chemical attack, resistant to corrosive and alkali and resistant to weathering as the situation may require.

The compositions that can be used are those that have the necessary viscosities, as mentioned above, when being blown to form stable films which have a rapid change from the molten or liquid state to the solid or hard state with a relatively narrow temperature change. That is, they change from liquid to solid within a relatively narrowly defined temperature range.

The hollow microspheres made in accordance with the present invention can be made from a glass composition, preferably a low heat conductivity glass composition, they are substantially uniform in diameter and wall thickness, have a clear, hard, smooth surface and are resistant to chemical attack, high temperatures and weathering. The hollow glass microspheres are substantially uniform in diameter and wall thickness, and depending on their composition and blowing conditions are light transparent, translucent or opaque, soft or hard, and smooth or rough. The wall of the microspheres are free or substantially free of any holes, relatively thinned wall portions or sections, sealing tips, trapped gas bubbles, or sufficient amounts of dissolved gases to form bubbles. The microspheres are also free of any latent solid or liquid blowing gas materials or gases.

The preferred glass compositions are those that are resistant to chemical attack, elevated temperatures, weathering and diffusion of gases into and/or out of the microspheres. Where the blowing gases may decompose at elevated temperatures, glass compositions that are liquid below the decomposition temperatures of the gases can be used.

The microspheres, because the walls are substantially free of any holes, thinned sections, trapped gas bubbles, and/or sufficient amounts of dissolved gases to form trapped bubbles, are substantially stronger than the microspheres heretofore produced. The absence of a sealing tip also makes the microsphere stronger.

The glass microspheres can be made in various diameters and wall thickness, depending upon the desired end use of the microspheres. The microspheres can have an outer diameter of 200 to 10,000 microns, preferably 500 to 6,000 microns and more preferably 1,000 to 4,000 microns. The microspheres can have a wall thickness of 0.1 to 1,000 microns, preferably 0.5 to 400 microns and more preferably 1 to 100 microns.

The microspheres can contain an inert gas at superatmospheric pressure, about ambient pressure or a partial vacuum in the enclosed volume. The partial vacuum can be obtained by using a blowing gas which partially within the microsphere.

The microspheres can contain a high vacuum in the enclosed volume where a metal vapor is used as a blowing gas and the metal vapor is cooled, condenses and deposits as a thin metal coating on the inner wall surface of the hollow microsphere. The pressure in the microsphere will be equal to the vapor pressure of the deposited metal at ambient temperature.

The thickness of the thin metal coating deposited on the inner wall surface of the mirosphere will depend on the metal vapor used to blow the microsphere, the pressure of the metal vapor and the size of the microsphere. The thickness of the thin metal coating can be 25 to 1000 Å, preferably 50 to 60 Å, and more preferably 100 to 400 Å.

When it is specifically desired that the deposited metal coating be transparent, e.g. to sunlight, the coating should be less than 100 Å and preferably less than 80 Å. The transparent metal coated microspheres can have a deposited metal coating 25 to 95 Å and preferably 50 to 80 Å thick.

When it is specifically desired that the deposited metal coating be reflective, e.g. to sunlight, the coating should be more than 100 Å and preferably more than 150 Å thick. The reflective metal coated microspheres can have a deposited metal coating 105 to 600 Å and preferably 150 to 400 Å thick and more preferably 150 to 250 Å.

The diameter and wall thickness of the hollow microspheres will of course effect the average bulk density of the microspheres. The glass microspheres and glass vacuum microspheres prepared in accordance with the invention will have an average bulk density of 1 to 15 lb/ft$^3$, preferably 1.5 to 12 lb/ft$^3$ and more preferably 2 to 9 lb/ft$^3$. For use in a preferred embodiment to make low density insulating materials, the hollow glass microspheres can have an average bulk density as low as 0.5 to 1.5, for example 1.0 lb/ft$^3$.

Where the microspheres are formed in a manner such that they are connected by continuous thin glass filaments, that is they are made in the form of filamented microspheres, the length of the connecting filaments can be 1 to 40, usually 2 to 20 and more usually 3 to 15 times the diameter of the microspheres. The diameter, that is the thickness of the connecting filaments, can be 1/5000 to 1/10, usually 1/2500 to 1/20 and more usually 1/1000 to 1/30 of the diameter of the microspheres.

The microspheres can contain a gas at superatmospheric pressure, about ambient pressure or at partial or hard, i.e. high vacuum.

Where the microspheres are used as insulating materials and in insulating systems, or in syntactic foam systems, or as filler material in general, the microspheres can have an outer diameter of 200 to 5,000, preferably 500 to 3,000 and more preferably 750 to 2,000 microns. The mirospheres can have a wall thickness of 0.1 to 500 microns, preferably 0.5 to 200 microns and more preferably 1 to 50 microns. The microspheres can have an average bulk density of 0.3 to 15 lb/ft$^3$, preferably 0.5 to 10 lb/ft$^3$ and more preferably 0.75 to 5.0 lb/ft$^3$. When used as insulating materials, the microspheres can contain a hard vacuum. When used as filler materials, the microspheres can have a contained gas pressure of 5 to 100 p.s.i.a., preferably 5 to 75 p.s.i.a. and more preferably 5 to 12 p.s.i.a.

In a preferred embodiment of the invention, the ratio of the diameter to the wall thickness of the microspheres is selected such that the microspheres are flexible, i.e. can be deformed under pressure without breaking.

The microspheres can contain a thin metal layer deposited on the inner wall surface of the microsphere where the blowing gas contains dispersed metal particles. The thickness of the thin metal coating deposited on the inner wall surface of the microsphere will depend on the amount and particle size of the dispersed metal particles or partial pressure of organo metal blowing gas that are used and the diameter of the microsphere. The thickness of the thin metal coating can be 25 to 10,000 Å, preferably 50 to 5,000 Å and more preferably 100 to 1,000 Å.

When it is desired that the deposited metal coating be transparent to light, the coating should be less than 100 Å and preferably less than 80 Å. The transparent metal coated microspheres can have a deposited metal coating 25 to 95 Å and preferably 50 to 80 Å thick. The microspheres, though transparent to visible light, are substantially reflective of infrared radiation.

When it is desired that the deposited metal coating be reflective to light, the coating can be more than 100 Å and preferably more than 150 Å thick. The reflective metal coated microspheres can have a deposited metal coating 105 to 600 Å, preferably 150 to 400 Å and more preferably 150 to 250 Å thick.

A particular and advantageous feature of the present invention is that the thickness of the thin deposited metal vapor layer can be selected such that the thermal conductivity of the metal forming the metal layer will be about one-fourth that of the thermal conductivity of the bulk metal. This substantial reduction in the thermal conductivity of the deposited metal vapor layer is, however, to some extent effected by the manner in which the metal layer is deposited.

The reduced thermal conductivity effect can be obtained with a deposited metal thickness of 25 Å to 250 Å, preferably 50 Å to 200 Å and more preferably 75 Å to 150 Å.

The thermal conductivity of the metal layer can be further reduced by controlling the metal layer deposition temperature in a manner such that metal crystal growth produces discontinuities in the deposited metal film.

The thermal heat conductivity characteristics of heat barriers made from the microspheres can be further improved by partially flattening the microspheres into an oblate spheroid shape. The thermal conductivity of the oblate spheroids is further improved by mixing with the oblate spheroids thin glass filaments. The filaments are preferably provided in the form of the filamented microspheres.

The filamented microspheres can as they are formed be drawn and laid on a conveyor belt or drum. A sufficient amount of tension can be maintained on the filamented microspheres as they are drawn to stretch them into the oblate spheroid shape. The filamented microspheres are maintained in that shape for a sufficient period of time to harden. After hardening of the filamented oblate spheroids, they can be laid in a bed, an adhesive and/or foam can be added and the filamented microspheres can be made into, e.g. a four by eight foot formed panel. The panel can be ¼ to 3 inches, for example, ½, 1, 1½ or 2 inches, in thickness.

The hollow glass microspheres of the present invention have a distinct advantage of being very strong and capable of supporting a substantial amount of weight. They can thus be used to make a simple inexpensive self-supporting or load bearing vacuum system.

EXAMPLES

Example 1

A glass composition comprising the following constituents is used to make hollow glass microspheres.

| | SiO$_2$ | Al$_2$O$_3$ | CaO | MgO | B$_2$O$_3$ | Na$_2$O |
|---|---|---|---|---|---|---|
| Wt % | 55–57 | 18–22 | 5–7 | 10–12 | 4–5 | 1–2 |

In Examples 1 to 5, the centrifuge rotor is 12 inches in diameter and is operated between 1600 to 2100 RPM.

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 to 3 of the drawings. The molten glass passes through annular space 58 of blowing nozzle 55 and forms a thin liquid molten glass film across the orifices 56a and 57a. The blowing nozzle 55 has an outside diameter of 0.040 inch and orifice 57a has an inside diameter of 0.030 inch. The thin liquid molten glass film has a diameter of 0.030 inch and a thickness of 0.005 inch. An inert blowing gas consisting of xenon or nitrogen at a temperature of 2650° F. and at a positive pressure is applied to the inner surface of the molten glass film causing the film to distend outwardly into an elongated cylinder shape with its outer end closed and its inner end attached to the outer edge of orifice 57a.

The transverse jet is used to direct an inert entraining fluid which consists of nitrogen at a temperature of 2600° F. over and around the blowing nozzle 55 which entraining fluid assists in the formation and closing of the elongated cylinder shape and the detaching of the cylinder from the blowing nozzle and causing the cylinder to be entrained in the entraining fluid. The transverse jet is aligned at an angle of 35° to 50° relative to the blowing nozzle and a line drawn through the center axis of the transverse jet intersects a line drawn through the center axis of the blowing nozzle 55 at a point 2 to 3 times the outside diameter of the coaxial blowing nozzle 55 radially inward of the orifice 57a.

The entrained, elongated cylinders quickly assume a spherical shape and are rapidly cooled to about ambient temperature by a quench fluid consisting of a fine water spray at a temperature of 90° to 150° F. which quickly cools, solidifies and hardens the glass microspheres.

Clear, smooth, hollow glass microspheres having a 2000 to 3000 micron diameter, a 20 to 40 micron wall thickness and filled with xenon or nitrogen gas at an internal contained pressure of 3 p.s.i.a. are obtained. The microspheres are closely examined and are found to be free of any entrapped bubbles and/or holes and are particularly suitable for use as filler materials.

Example 2

A glass composition comprising the following constituents is used to make transparent hollow glass vacuum microspheres.

| | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2650° to 2750° F. to form a fluid molten glass having a viscosity of 35 to 60 poises and a surface tension of 275 and 325 dynes per cm.

The molten glass is fed to the apparatus of FIGS. 1 and 4a of the drawings. The molten glass is passed through annular space 58 of blowing nozzle 55 and into tapered portion 71 of outer nozzle 57. The molten glass under pressure is squeezed through a fine gap formed between the outer edge of orifice 56a and the inner surface 72 of the tapered portion 71 of outer nozzle 57 and forms a thin liquid molten glass film across the orifices 56a and 57a'. The blowing nozzle 55 has an outside diameter of 0.04 inch and orifice 57a' has an inside diameter of 0.01 inch. The thin liquid molten glass film has a diameter of 0.01 inch and a thickness of 0.003 inch. An inert zinc vapor blowing gas at a temperature of 2700° F. and at a positive pressure is applied to the inner surface of the molten glass film causing the film to distend outwardly into an elongated cylinder shape with its outer end closed and its inner end attached to the outer edge of orifice 57a'.

The transverse jet is used to direct an inert entraining fluid which consists of nitrogen at a temperature of 2600° F. over and around the blowing nozzle 55 which entraining fluid assists in the formation and closing of the elongated cylinder shape and the detaching of the cylinder from the blowing nozzle. The transverse jet is aligned at an angle of 35° ot 50° relative to the blowing nozzle and a line drawn through the center axis of the transverse jet intersects a line drawn through the center axis of the blowing nozzle 55 at a point 2 to 3 times the outside diameter of the coaxial blowing nozzle radially inward of orifice 57a'.

The entrained elongated cylinders filled with the zinc vapor quickly assume a spherical shape. The microspheres are contacted with a quench fluid consisting of a fine water spray at a temperature of 90° to 150° F. which quickly cools, solidifies and hardens the molten glass prior to cooling and condensing the zinc vapor. The zinc vapor begins to condense at a temperature of about 1660° to 1670° F. at which the glass composition used to make the microspheres has already began to harden and has sufficient strength not to collapse as the zinc vapor begins to and condenses on the inner wall surface of the microsphere. As the microsphere is further cooled, the zinc vapor condenses and deposits on the inner wall surface of the microsphere as a thin zinc metal coating.

Clear, smooth, hollow glass microspheres having an about 800 to 900 micron diameter, a 8 to 20 micron wall thickness and having a thin transparent zinc metal coating 85 to 95 Å thick and an internal contained pressure of $10^{-4}$ to $10^{-6}$ Torr are obtained.

Example 3

A glass composition comprising the following constituents is used to make low emissivity, reflective hollow glass vacuum microspheres.

| | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 and 4a of the drawings. The molten glass is passed through annular space 58 of blowing nozzle 55 and into tapered portion 71 of outer nozzle 57. The molten glass under pressure is squeezed through a fine gap formed between the outer edge of orifice 56a and the inner surface 72 of the tapered portion 71 of outer nozzle 57 and forms a thin liquid molten glass film across the orifices 56a and 57a'. The blowing nozzle 55 has an outside diameter of 0.05 inch and orifice 57a' has an inside diameter of 0.03 inch. The thin liquid molten glass film has a diameter of 0.33 inch and a thickness of 0.01 inch. An inert zinc vapor blowing gas at a temperature of 2600° F. and at a positive pressure is applied to the inner surface of the molten glass film causing the film to distend outwardly into an elongated cylinder shape with its outer and closed and its inner end attached to the outer edge of orifice 57a.

The transverse jet is used to direct an inert entraining fluid which consists of nitrogen gas at a temperature of 2500° F. at a linear velocity of 40 to 100 feet a second over and around the blowing nozzle 55 which entraining fluid assists in the formation and closing of the elongated cylinder shape and the detaching of the cylinder from the blowing nozzle and causing the cylinder to be entrained in the entraining fluid. The transverse jet is aligned at an angle of 35° to 50° relative to the blowing nozzle and a line drawn through the center axis of the transverse jet intersects a line drawn through the center axis of the blowing nozzle 55 at a point 2 to 3 times the outside diameter of the coaxial blowing nozzle 55 radially inward of orifice 57a'.

The free entrained elongated cylinders filled with the zinc vapor quickly assume a spherical shape. The microspheres are contacted with a quench fluid consisting of an ethylene glycol spray at a temperature of 0° to 15° F. which quickly cools, solidifies and hardens the molten glass prior to cooling and condensing the zinc vapor. The zinc vapor begins to condense at a temperature of about 1660° to 1670° F. at which the glass composition used to make the microspheres has already began to harden and has sufficient strength not to collapse as the zinc vapor begins to and condenses on the inner wall surface of the microspheres. As the microsphere is further cooled, the zinc vapor condenses and deposits on the inner wall surface of the microsphere as a thin zinc metal coating.

Clear, smooth, hollow glass microspheres having an about 3000 to 4000 micron diameter, a 30 to 40 micron wall thickness and having a low emissivity, reflective zinc metal coating 325 to 450 Å thick and an internal contained pressure of $10^{-4}$ to $10^{-6}$ Torr are obtained.

Example 4

A glass composition comprising the following constituents is used to make low emissivity reflective hollow glass vacuum filamented microspheres.

|  | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2500° to 2600° F. to form a fluid molten glass having a viscosity of 100 to 200 poises.

The molten glass is fed to the apparatus of FIGS. 1 and 4a of the drawings under conditions similar to those used in Example 3.

An inert zinc vapor blowing gas at a temperature of 2400° F. and at a positive pressure is applied to the inner surface of the molten glass film causing the film to distend outwardly into an elongated cylinder shape with its outer end closed and its inner end attached to the outer edge of orifice 57a'.

The transverse jet is used to direct an entraining fluid which consists of nitrogen gas at a temperature of 2400° F. at a linear velocity of 5 to 40 feet a second over and around the blowing nozzle 55 which entraining fluid assists in the formation and closing of the elongated cylinder shape and the detaching of the cylinder from the blowing nozzle while trailing a thin glass filament which is continuous with the next microsphere forming at the blowing nozzle. The filamented microspheres are otherwise formed in the manner illustrated and described with reference to FIG. 4c of the drawings. The transverse jet is aligned at an angle of 35° to 50° relative to the blowing nozzle and a line drawn through the center axis of the transverse jet intersects a line drawn through the center axis of the blowing nozzle 55 at a point 2 to 3 times the outside diameter of the coaxial blowing nozzle 55 radially inward of orifice 57a'.

The entrained elongated filamented cylinder filled with the zinc vapor assumes a spherical shape. The filamented microspheres are contacted with a quench fluid consisting of water spray at a temperature of 60° to 100° F. which quickly cools, solidifies and hardens the molten glass prior to cooling and condensing the zinc vapor after which the zinc condenses on the inner wall surface of the microsphere.

Clear, smooth, hollow filamented glass microspheres having an about 1500 to 2500 micron diameter, a 1.5 to 5.0 micron wall thickness and having a low emissivity, reflective zinc metal coating 180 to 275 Å thick and an internal contained pressure of $10^{-5}$ Torr are obtained. The lengths of the filament portions of the filamented microspheres is 10 to 20 times the diameter of the microspheres. The microspheres are closely examined and are found to be free of any entrapped bubbles and/or holes.

Example 5

A glass composition comprising the following constituents is used to make low emissivity, reflective hollow glass microspheres containing a thin deposited metal layer which is deposited from dispersed metal particles.

|  | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2650° to 2750° F. to form a fluid molten glass having a viscosity of 35 to 60 poises.

The molten glass is fed to the apparatus of FIGS. 1 and 4a of the drawing under conditions similar to those used in Example 3.

A blowing gas consisting of argon and containing finely dispersed aluminum particles of 0.03 to 0.05 micron size at a temperature of 2700° F. and at a positive pressure is applied to the inner surface of the molten glass film causing the film to distend downwardly into an elongated cylinder shape with its outer end closed and its inner end attached to the outer edge of orifice 57a'.

The transverse jet is used as before to direct an entraining fluid which consists of nitrogen gas at a temperature of 2500° F. over and around the blowing nozzle 55.

The entrained elongated cylinders filled with the argon gas containing the dispersed aluminum particles quickly assume a spherical shape. The microspheres are contacted with a quench fluid consisting of an ethylene glycol spray at a temperature of 0° to 15° F. which quickly cools, solidifies and hardens the molten glass. As the microspheres are further cooled and hardened, the aluminum particles deposit on the inner wall surface of the microsphere as a thin aluminum metal coating.

Clear, smooth, hollow glass microspheres having an about 1500 to 2500 micron diameter, a 5 to 15 micron wall thickness and having a low emissivity, reflective aluminum metal coating 600 to 1000 Å thick and an internal contained pressure about 5 p.s.i.a. are obtained. The microspheres as before are free of any trapped gas bubbles and/or holes.

Example 6

A relatively low melting temperature glass composition comprising the following consituents is used to make hollow glass microspheres for use as a filler material.

|  | $SiO_2$ | $Al_2O_3$ | CaO | MgO | $B_2O_3$ | $Na_2O$ | $K_2O$ |
|---|---|---|---|---|---|---|---|
| Wt% | 54–56 | 3—4 | 12–14 | 0.4–0.8 | 8–10 | 16–18 | 0.6–1.4 |

The centrifuge rotor is 15 inches in diameter and is operated at about 1800 RPM.

The glass composition is heated to a temperature of 1800° to 2200° F. to form a fluid molten glass having a viscosity of 80 to 300 poises.

The molten glass is fed to the apparatus of FIGS. 1 and 4a of the drawings. The molten glass passes through annular space 58 of blowing nozzle 55 and into tapered portion 71 of outer nozzle 57. The molten glass under pressure is squeezed through a fine gap formed between the outer edge of orifice 56a and the inner surface 72 of the tapered portion 71 of outer nozzle 57 and forms a thin liquid molten glass film across the orifices 56a and 57a'. The blowing nozzle 55 has an outside diameter of 0.05 inch and orifice 57a' has an inside diameter of 0.030 inch. The thin liquid molten glass film has a diameter of 0.030 inch and a thickness of 0.01 inch. An inert blowing gas consisting of xenon or nitrogen at a temperature of 2250° F. and at a positive pressure is applied to the inner surface of the molten glass film causing the film to distend downwardly into an elongated cylinder shape with its outer end closed and its inner end attached to the outer edge of orifice 57a.

The transverse jet is used to direct an inert entraining fluid which consists of nitrogen at a temperature of 2200° F. over and around the blowing nozzle 55 which entraining fluid assists in the formation and closing of the elongated cylinder shape and the detaching of the cylinder from the blowing nozzle and causing the cylinder to be entrained in the entraining fluid. The transverse jet is aligned at an angle of 35° to 50° relative to the blowing nozzle and a line drawn through the center axis of the transverse jet intersects a line drawn through the center axis of the blowing nozzle 55 at a point 2 to 3 times the outside diameter of the coaxial blowing nozzle 55 radially inward of the orifice 57a'.

The entrained, elongated cylinders quickly assume a spherical shape and are rapidly cooled to about ambient temperature by a quench fluid consisting of a fine water spray at a temperature of 90° to 150° F. which quickly cools, solidifies and hardens the glass microspheres.

Clear, smooth, hollow glass microspheres having a 2000 to 3000 micron diameter, a 20 to 40 micron wall thickness and filled with xenon or nitrogen gas at an internal contained pressure of about 3 to 5 p.s.i.a. are obtained. The microspheres are closely examined and are found to be free of any entrapped bubbles and/or holes and are particularly suitable for use as filler materials.

Example 7

A relatively low melting temperature glass composition comprising the following constituents is used to make low emissivity, reflective hollow glass vacuum microspheres.

| | $SiO_2$ | $Al_2O_3$ | CaO | MgO | $B_2O_3$ | $Na_2O$ | $K_2O$ |
|---|---|---|---|---|---|---|---|
| Wt% | 53–56 | 3–4 | 12–14 | 0.4–0.8 | 8–10 | 16–18 | 0.6–1.4 |

The centrifuge rotor is 15 inches in diameter and is operated at about 1800 RPM.

The glass composition is heated to a temperature of 1800° to 2200° F. to form a fluid molten glass having a viscosity of 80 to 300 poises.

The molten glass is fed to the apparatus of FIGS. 1 and 4a of the drawings. The molten glass is passed through annular space 58 of blowing nozzle 55 and into tapered portion 71 of outer nozzle 57. The molten glass under pressure is squeezed through a fine gap formed between the outer edge of orifice 56a and the inner surface 72 of the tapered portion 71 of outer nozzle 57 and forms a thin liquid molten glass film across the orifices 56a and 57a'. The blowing nozzle 55 has an outside diameter of 0.05 inch and orifice 57a' has an inside diameter of 0.03 inch. The thin liquid molten glass film has a diameter of 0.03 inch and a thickness of 0.01 inch. An inert zinc vapor blowing gas at a temperature of 2250° F. and at a positive pressure is applied to the inner surface of the molten glass film causing the film to distend outwardly into an elongated cylinder shape with its outer end closed and its inner end attached to the outer edge of orifice 57a.

The transverse jet is used to direct an inert entraining fluid which consists of nitrogen gas at a temperature of 2200° F. over and around the blowing nozzle 55 which entraining fluid assists in the formation and closing of the elongated cylinder shape and the detaching of the cylinder from the blowing nozzle and causing the cylinder to be entrained in the entraining fluid. The transverse jet is aligned at an angle of 35° to 50° relative to the blowing nozzle and a line drawn through the center axis of the transverse jet intersects a line drawn through the center axis of the blowing nozzle 55 at a point 2 to 3 times the outside diameter of the coaxial blowing nozzle 55 radially inward of orifice 57a'.

The entrained elongated cylinders filled with the zinc vapor quickly assume a spherical shape. The microspheres are contacted with a quench fluid consisting of a fine water spray at a temperature of 90° to 150° F. which quickly cools, solidifies and hardens the molten glass prior to cooling and condensing the zinc vapor. The zinc vapor begins to condense at a temperature of about 1660° to 1670° F. at which the glass composition used to make the microspheres has already began to harden and has sufficient strength not to collapse as the zinc vapor begins to and condenses on the inner wall surface of the microspheres. As the microsphere is further cooled, the zinc vapor condenses and deposits on the inner wall surface of the microsphere as a thin zinc metal coating.

Clear, smooth, hollow glass microspheres having an about 3000 to 4000 micron diameter, a 30 to 40 micron wall thickness and having a low emissivity, reflective zinc metal coating 325 to 450 Å thick and an internal contained pressure of $10^{-4}$ to $10^{-6}$ Torr are obtained.

UTILITY

The hollow glass microspheres of the present invention have many uses including the manufacture of superior insulating materials and the use of the microspheres as a filler or aggregate in cement, plaster and asphalt and synthetic construction board materials. The microspheres can also be used in the manufacture of insulated louvers and molded objects or forms.

The hollow microspheres can be produced from inorganic and organic film forming materials and compositions, from glass and plastic compositions and from high melting temperature glass and plastic compositions.

The process and apparatus of the present invention can be used to blow microspheres from suitable inorganic and organic film forming materials or compositions having sufficient viscosity at the temperature at which the microspheres are blown to form a stable elongated cylinder shape of the material being blown and to subsequently be detached to form the spherical shaped microspheres and on cooling to form a hardened film. The hollow microspheres and glass microspheres, depending on the composition from which made, are stable to many chemical agents and weathering conditions.

The microspheres, because they are made from very stable glass compositions, are not subject to degradation by outgassing, aging, moisture, weathering or biological attack and do not produce toxic fumes when exposed to very high temperatures or fire.

The glass compositions can be transparent, translucent or opaque. A suitable coloring material can be added to the glass compositions to aid in identification of microspheres of specified size, wall thickness and contained gaseous material.

In carrying out the process of the present invention, the glass material to be used to form the microspheres is selected and can be treated and/or mixed with other materials to adjust their viscosity and surface tension characteristics such that at the desired blowing temperatures they are capable of forming hollow microspheres of the desired size and wall thickness.

The process and apparatus described herein can as mentioned above also be used to encapsulate and store gaseous material in hollow glass microspheres of a suitable non-interacting composition, thereby allowing storage or handling of gases generally, and of corrosive and toxic or otherwise hazardous gases specifically. Because of their small size and relative great strength, the gases may be encapsulated into hollow microspheres at elevated pressures, thus allowing high pressure storage of these gases. In the case where disposal by geological storage is desired, for example for poisonous and/or other toxic gases, the gases can be encapsulated in very durable alumina silicate or zirconia glass microspheres which can subsequently be embedded, if desired, in a concrete structure. The glass microspheres of the present invention, because they can be made to contain gases under high pressure, can be used to manufacture fuel targets for laser fusion reactor systems.

The process and apparatus of the present invention can as mentioned above also be used to form microspheres from thermosetting and thermoplastic resin materials such as polyethylene, polypropylene, polystyrene, polyesters, polyurethanes, phenolformaldehyde resins and silicone and carbonate resins. The lower temperature melting resins are particularly useful for encapsulating gases that are unstable at high temperatures.

The process and apparatus of the invention can also be used to form hollow microspheres from metals such as iron, steel, nickel, gold, copper, zinc, tin, brass, lead, aluminum and magnesium. In order to form microspheres from these materials, suitable additives are used which provide at the surface of a blown microsphere a sufficiently high viscosity that a stable microsphere can be formed.

The process of the present invention can be carried out in a centrifuge apparatus in which the coaxial blowing nozzles are disposed in the outer circumferal surface of the centrifuge. Liquid glass is fed into the centrifuge and because of centrifugal forces rapidly coats and wets the inner wall surface of the outer wall of the centrifuge. The liquid glass is fed into the outer coaxial nozzle. The inlet to the inner coaxial nozzle is disposed above the coating of liquid glass. The blowing gas is as before fed into the inner coaxial nozzle. The transverse jet entraining fluid is provided by transverse jets mounted on the outer surface of the rotating bowl.

An external gas can be directed along the longitudinal axis of the centrifuge to assist in removing the microspheres from the vicinity of the centrifuge as they are formed. Quench fluids can be provided as before.

The process of the present invention can also be carried out in a centrifuge apparatus in which the coaxial blowing nozzles are disposed in the outer circumferal surface of the centrifuge at an angle of 15° to 75° away from the direction of rotation. Molten glass and blowing gas are provided as before. The transverse jet entraining fluid is provided by the action of the ambient gas outside of the centrifuge as the centrifuge rotates about its central axis. For example, the transverse jet entraining fluid function can be provided by the action of the ambient gas, outside of the centrifuge, passing over a deflection baffle disposed on the peripheral wall of the centrifuge as the centrifuge rotates.

These and other uses of the present invention will become apparent to those skilled in the art from the foregoing description and the following appended claims.

It will be understood that various changes and modifications may be made in the invention, and that the scope thereof is not to be limited except as set forth in the claims.

I claim:

1. A method for making hollow microspheres from inorganic or organic film forming material which comprises feeding said material to a centrifuge apparatus comprising a rotor, rotating said rotor about a central axis, forming a liquid film of said material across an orifice disposed in or carried on the peripheral wall of said rotor, applying a blowing gas at a positive pressure on the inner surface of the liquid film to blow the film and form the microsphere, subjecting the microsphere during its formation to an external pulsating or fluctuating pressure field having periodic oscillations, said pulsating or fluctuating pressure field acting on said microsphere to assist in its formation and to assist in detaching the microsphere from said orifice.

2. The method of claim 1 wherein the liquid film of inorganic or organic film forming material is formed across the orifice of a coaxial blowing nozzle disposed in or carried on the peripheral wall of said rotor, said blowing nozzle having an inner nozzle to convey said blowing gas to the inner surface of the liquid film, and an outer nozzle to convey said film forming material to said orifice.

3. The method of claim 1 wherein the inorganic film forming material has a viscosity of 10 to 600 poises.

4. The method of claim 1 wherein the inorganic film forming material has a viscosity of 20 to 100 poises.

5. The method of claim 1 wherein the inorganic film forming material has a viscosity of 100 to 400 poises.

6. The method of claim 1 wherein the blowing gas pressure is sufficient to blow the microsphere and is less than 100 p.s.i.g.

7. The method of claim 1 wherein said blowing gas is an inert gas.

8. The method of claim 1 wherein the blowing gas contains dispersed metal particles.

9. The method of claim 1 wherein said blowing gas contains an organo metal compound.

10. The method of claim 1 wherein said blowing gas is a metal vapor.

11. The method of claim 2 wherein said blowing gas blows said film radially outward to form an elongated cylinder shaped liquid film of said organic or inorganic film forming material which is closed at its outer end and is connected at its inner end to the outer edge of the orifice of said blowing nozzle.

12. The method of claim 11 wherein the organic or inorganic film forming material is continuously fed to said blowing nozzle while said elongated cylinder is being formed.

13. The method of claim 1 wherein the inorganic film forming material is heated, an entraining fluid is directed at an angle to a coaxial blowing nozzle disposed in or carried on the peripheral wall of said rotor, said coaxial blowing nozzle having an orifice, an inner nozzle and an outer nozzle, the liquid film of inorganic film forming material is formed across the orifice, the blowing gas is conveyed to the inner surface of the liquid film through said inner nozzle, the inorganic film forming material is conveyed through said outer nozzle to said orifice, and the entraining fluid passes over and around said coaxial nozzle to to fluid dynamically induce the pulsating or fluctuating pressure field at the opposite or lee side of the blowing nozzle in the wake or shadow of the coaxial blowing nozzle.

14. The method of claim 13 wherein said entraining fluid is directed at said coaxial blowing nozzle through a transverse jet nozzle means which induces said pulsating or fluctuating pressure field.

15. The method of claim 13 wherein a gas or fluid deflection baffle means is disposed ahead of said coaxial blowing nozzle and deflects ambient gas or fluid over said coaxial blowing nozzle.

16. The method of claim 14 wherein a gas or fluid deflection baffle means is disposed ahead of said coaxial blowing nozzle and induces a pulsating or fluctuating pressure field in the area proximate to the coaxial blowing nozzle to reinforce the pulsating or fluctuating pressure field induced by said transverse jet entraining fluid.

17. A method for making filamented, hollow glass microspheres having a high contained vacuum, which comprises heating glass to form molten glass, feeding said molten glass to a centerfuge apparatus comprising a rotor, rotating said rotor about a central axis, forming a liquid film of molten glass across an orifice of a coaxial blowing nozzle, said blowing nozzle being disposed in or on the peripheral wall of said rotor, said blowing nozzle having an inner nozzle to convey metal vapor blowing gas to the inner surface of the liquid film and an outer nozzle to convey said molten glass to said orifice, the lower portion of said outer nozzle being tapered inwardly to form with the outer edge of the inner nozzle a fine gap, feeding the molten glass under pressure through said gap and forming said thin film of molten glass across said orifice of the blowing nozzle, applying said metal vapor blowing gas through said inner nozzle at positive pressure on the inner surface of the liquid film to blow the film radially outward to form the microsphere, continuously feeding said molten glass to said outer nozzle while said microsphere is being formed, directing an entraining fluid at said coaxial blowing nozzle, at a linear velocity in the region of microsphere formation of about 1 to 50 feet per second to obtain connecting glass filaments between microspheres, and at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling, solidifying and hardening said microsphere to obtain microspheres of 500 to 6,000 microns diameter and 0.5 to 400 microns wall thickness, said microspheres being connected by thin filamented portions that are continuous with the glass microspheres, and depositing said metal vapor as a thin metal coating 50° to 600° A. thick on the innerwall surface of the microspheres to form filamented microspheres having a contained vacuum having a pressure at ambient temperature which is about the vapor pressure of said metal at ambient temperature.

18. The method of claim 13 wherein said entraining fluid has a linear velocity in the region of microsphere formation of 1 to 120 ft/sec and entrains and transports the microspheres away from the blowing nozzle.

19. The method of claim 18 wherein said entraining fluid has a linear velocity in the region of microsphere formation of 40 to 100 ft/sec.

20. The method of claim 18 wherein said entraining fluid has a linear velocity in the region of microsphere formation of 5 to 40 ft/sec.

21. The method of claim 13 wherein quench means direct a quench fluid into contact with said microsphere to rapidly cool and solidify said microsphere.

22. The method of claim 13 wherein said entraining fluid is directed at said coaxial blowing nozzle at an angle of 15° to 85° relative to a line drawn through the center axis of said coaxial blowing nozzle and said outer nozzle.

23. The method of claim 13 wherein said entraining fluid intersects said coaxial blowing nozzle at a point 0.5 to 6 times the outside diameter of the coaxial blowing nozzle radially inward of the orifice of said outer nozzle.

24. The method of claim 13 wherein the lower portion of the outer nozzle is tapered inwardly to form with the outer edge of the inner nozzle a fine gap and the inorganic film forming material is fed under pressure and extruded through said gap to form a thin film of inorganic film forming material across the orifice of the blowing nozzle.

25. The method of claim 1 wherein said pulsating or fluctuating pressure field is induced by a gas or fluid deflection baffle means disposed ahead of a coaxial blowing nozzle having a liquid inorganic film forming material formed across the orifice of said coaxial nozzle and said coaxial nozzle having an inner nozzle to convey said blowing gas to the inner surface of the liquid film and an outer nozzle to convey said inorganic film forming material to said orifice.

26. The method of claim 25 wherein said gas or fluid deflection baffle means fluid dynamically induces said pulsating or fluctuating pressure field in the region of microsphere formation and said pressure field has periodic oscillations.

27. A method for making hollow glass microspheres which comprises heating glass to form a molten glass, feeding said molten glass to a centrifuge apparatus comprising a rotor, rotating said rotor about a central axis, forming a liquid film of molten glass across an orifice disposed in or on the peripheral wall of said rotor, applying a blowing gas at a positive pressure on the inner surface of the liquid film to blow the film and form a microsphere, subjecting the microsphere during its formation to a pulsating or fluctuating pressure field having periodic oscillations, said pulsating or fluctuating pressure field acting on said microsphere to assist in its formation and to assist in detaching the microspheres from said orifice.

28. The method of claim 27 wherein said liquid film of molten glass is formed across the orifice of a coaxial blowing nozzle, said blowing nozzle having an inner nozzle to convey said blowing gas to the inner surface of the liquid film and an outer nozzle to convey said molten glass to said orifice.

29. A method for making hollow glass microspheres which comprises heating glass to form a molten glass, feeding said molten glass to a centrifuge apparatus comprising a rotor, rotating said rotor about a central axis, forming a liquid film of molten glass across an orifice of a coaxial blowing nozzle, said blowing nozzle being disposed in or on the peripheral wall of said rotor, said blowing nozzle having an inner nozzle to convey an inert gas or metal vapor blowing gas to the inner surface of the liquid film and an outer nozzle to convey said molten glass at a temperature of 2000° to 2800° F. to said orifice, applying said inert gas or metal vapor blowing gas through said inner nozzle at positive pressure on the inner surface of the liquid film to blow the film radially outward to form an elongated cylinder shaped liquid film of molten glass which is closed at its outer end and connected at its inner end to the outer edge of the orifice of said blowing nozzle, continuously feeding said molten glass to said nozzle while said elongated cylinder is being formed, directing an entraining fluid at said coaxial blowing nozzle at an angle of 25° to 75° relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, whereby said entraining fluid envelops and acts on the elongated cylinder to flap, fold, pinch and close-off said elongated cylinder at its inner end at a point proximate to the coaxial blowing nozzle and said entraining fluid acting through drag forces on said cylinder to detach the cylinder from the coaxial blowing nozzle whereby surface tension forces cause the cylinder to form a spherical shape microsphere and directing a quench fluid into contact with said microsphere to rapidly cool and solidify said microsphere.

30. The method of claim 29 wherein the blowing gas is an inert gas.

31. The method of claim 29 wherein the blowing gas is a metal vapor.

32. The method of claim 29 wherein the glass microspheres are 200 to 10,000 microns in diameter.

33. The method of claim 29 wherein the glass microspheres have a wall thickness of 0.1 to 1,000 microns.

34. The method of claim 29 wherein said entraining fluid intersects said coaxial blowing nozzle at a point 0.5 to 6 times the outside diameter of the coaxial blowing nozzle radially inward of the orifice of said blowing nozzle.

35. The method of claim 34 wherein said entraining fluid is directed at said coaxial blowing nozzle through a transverse jet disposed a distance of 0.5 to 14 times the outside diameter of the coaxial blowing nozzle away from the point of intersect of a line drawn along the center axis of the transverse jet and a line drawn along the center axis of the coaxial blowing nozzle.

36. The method of claim 29 wherein the blowing gas is a metal vapor, the microsphere is cooled, hardened and solidified and a thin metal coating is deposited on the inner wall surface of the microsphere.

37. The method of claim 29 wherein the blowing gas is a low heat conductivity gas and the microsphere is cooled, hardened and solidified.

38. The method of claim 29 wherein the lower portion of the outer nozzle is tapered inwardly to form with the outer edge of the inner nozzle a fine gap and the molten glass is fed under pressure through said gap to form a thin film of molten glass across the orifice of the blowing nozzle.

39. A centrifuge apparatus for making inorganic or organic film forming material microspheres comprising a rotor carried for rotation about a central axis and having disposed in or carried on the peripheral wall of the rotor means for forming a liquid film of said material across an orifice, means for applying a blowing gas at a positive pressure on the inner surface of the liquid film to blow the film and form the microspheres and cooperating means for subjecting the microspheres during their formation to a pulsating or fluctuating pressure field having periodic oscillations, said pulsating or fluctuating pressure field acting on said microspheres to assist in their formation and to assist in detaching the microspheres from said orifice.

40. A centrifuge apparatus for making hollow inorganic or organic film forming material microspheres comprising a rotor carried for rotation about a central axis and having disposed in or carried on the outer peripheral wall of the rotor a coaxial blowing nozzle consisting of an inner nozzle having an orifice at the end thereof for a blowing gas and an outer nozzle having an orifice at the end thereof for said film forming material, said inner nozzle orifice being disposed proximate to said outer nozzle orifice, there being disposed proximate to said blowing nozzle means cooperating with said blowing nozzle by which there is induced a pulsating or fluctuating pressure field having periodic oscillations in the region of microsphere formation.

41. The centrifuge apparatus of claim 40 wherein said cooperating means comprises a transverse jet nozzle which directs an entraining fluid at said coaxial blowing nozzle to induce said pulsating or fluctuating pressure field.

42. The centrifuge apparatus of claim 40 wherein a gas or fluid deflection baffle means is disposed ahead of said coaxial blowing nozzle to deflect ambient gas or fluid over said coaxial blowing nozzle.

43. The centrifuge apparatus of claim 41 wherein a gas or fluid deflection baffle means is disposed ahead of said transverse jet nozzle and said gas or fluid deflection baffle means induces a pulsating or fluctuating pressure field to reinforce the pulsating or fluctuating pressure field induced by said transverse jet.

44. The centrifuge apparatus of claim 40 wherein said cooperating means comprises a gas or fluid deflection baffle means disposed ahead of said coaxial blowing nozzle to induce said pulsating or fluctuating pressure field.

45. The centrifuge apparatus of claim 44 wherein said gas or fluid deflection baffle means fluid dynamically induces said pulsating or fluctuating pressure field in the region of microsphere formation.

46. The centrifuge apparatus of claim 40 wherein means are provided for supplying a blowing gas to said centrifuge and said inner nozzle.

47. The centrifuge apparatus of claim 40 wherein means are provided for supplying an inorganic film forming material to said centrifuge and to said outer nozzle.

48. The centrifuge apparatus of claim 40 wherein means are provided for supplying an organic film forming material to said centrifuge and to said outer nozzle.

49. An apparatus for blowing hollow glass microspheres comprising means for holding molten glass, a rotor carried for rotation about a central axis and having disposed in or carried on the peripheral wall of the rotor a coaxial blowing nozzle consisting of an inner nozzle having an orifice at the end thereof for a blowing gas and an outer nozzle having an orifice at the end thereof for molten glass, said inner nozzle orifice being disposed proximate to said outer nozzle orifice, there being disposed external to said blowing nozzle a transverse jet cooperating with said blowing nozzle by which an entraining fluid is directed at said coaxial blowing nozzle at an angle of 25° to 75° relative to a line drawn through the center axis of said coaxial blowing nozzle such that said entraining fluid dynamically induces a pulsating or fluctuating pressure field having periodic oscillations at the opposite or lee side of the blowing nozzle in the wake or shadow of said blowing nozzle.

50. The apparatus of claim 49 wherein the outer nozzle at the end thereof is tapered inwardly.

51. The apparatus of claim 49 wherein the transverse jet has a flattened orifice.

52. The method of claim 2 wherein pulsating or fluctuating pressure inducing means is directed at an angle to said coaxial blowing nozzle to induce a pulsating or fluctuating pressure field at the opposite or lee side of said coaxial blowing nozzle in the wake or shadow of said coaxial blowing nozzle.

53. The method of claim 28 wherein pulsating or fluctuating pressure inducing means is directed at an angle to said coaxial blowing nozzle to induce a pulsating or fluctuating pressure field at the opposite or lee side of said coaxial blowing nozzle in the wake or shadow of said coaxial blowing nozzle.

54. A method for making hollow glass microspheres which comprises heating glass to form a molten glass, feeding said molten glass to a centrifuge apparatus comprising a rotor, rotating said rotor about a central axis, forming a liquid film of molten glass across an orifice of a coaxial blowing nozzle, said blowing nozzle being disposed in or on the peripheral wall of said rotor, said blowing nozzle having an inner nozzle to convey a blowing gas to the inner surface of the liquid film and an outer nozzle to convey said molten glass to said orifice, applying said blowing gas through said inner nozzle at positive pressure on the inner surface of the liquid film to blow the film radially outward to form the microsphere, continuously feeding said molten glass to said outer nozzle while said microsphere is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling and solidifying said microsphere.

55. The method of claim 54 wherein the lower portion of the outer nozzle is tapered inwardly to form with the outer edge of the inner nozzle a fine gap and feeding the molten glass under pressure through said gap to form a thin film of molten glass across the orifice of the blowing nozzle.

56. The method of claim 54 wherein the blowing gas is a metal vapor, the microsphere is cooled, hardened and solidified and a thin metal coating is deposited on the inner wall surface of the microsphere.

57. A centrifuge apparatus for making hollow inorganic or organic film forming material microspheres, comprising means for holding the inorganic or organic material, a rotor carried for rotating about a central axis and having disposed in or carried on the peripheral wall of the rotor a coaxial blowing nozzle comprising an inner nozzle having an inner orifice at the end thereof for a blowing gas and an outer nozzle having an outer orifice at the end thereof for said material, and means for feeding said material to said coaxial nozzle, said inner nozzle orifice being disposed proximate to said outer nozzle orifice, there being disposed external to said blowing nozzle means cooperating with said blowing nozzle by which there is induced a pulsating or fluctuating pressure field having periodic oscillations at the opposite or lee side of the blowing nozzle in the wake or shadow of said blowing nozzle.

58. The apparatus of claim 57 wherein the end portion of the outer nozzle is tapered inwardly to form with the outer edge of the inner nozzle a fine gap.

59. An apparatus for blowing hollow glass microspheres comprising means for holding molten glass, a rotor carried for rotation about a central axis and having disposed in or carried on the peripheral wall of the rotor a coaxial blowing nozzle comprising an inner nozzle having an inner orifice at the end thereof for a blowing gas and an outer nozzle having an outer orifice at the end thereof for the molten glass, and means for feeding said molten glass to said coaxial nozzle, said inner nozzle orifice being disposed proximate to said outer nozzle orifice, there being disposed external to said blowing nozzle a transverse jet cooperating with said blowing nozzle by which an entraining fluid is directed at said coaxial blowing nozzle at an angle relative to a line drawn through the center axis of said coaxial blowing nozzle such that said entraining fluid dynamically induces a pulsating or fluctuating pressure field having periodic oscillations at the opposite or lee side of the blowing nozzle in the wake or shadow of said blowing nozzle.

60. The apparatus of claim 59 wherein the end portion of the outer nozzle is tapered inwardly to form with the outer edge of the the inner nozzle a fine gap.

61. The apparatus of claim 59 wherein said transverse jet is directed at said coaxial blowing nozzle at an angle of 25° to 75° relative to said coaxial nozzle.

62. The apparatus of claim 59 wherein a line drawn along the center axis of the transverse jet intersects a line drawn along the center axis of the coaxial blowing nozzle at a point 0.5 to 6 times the outside diameter of the coaxial blowing nozzle radially inward of the orifice of said outer nozzle.

63. The apparatus of claim 59 wherein said transverse jet is disposed a distance of 0.5 to 14 times the outside diameter of the coaxial blowing nozzle radially inward from the point of intersect of a line drawn along the center axis of the transverse jet and a line drawn along the center axis of the coaxial blowing nozzle.

64. A method for making hollow glass microspheres having a high contained vacuum which comprises heating glass to form molten glass, feeding said molten glass to a centrifuge apparatus comprising a rotor, rotating said rotor about a central axis, forming a liquid film of molten glass across an orifice of a coaxial blowing nozzle, said blowing nozzle being disposed in or on the peripheral wall of said rotor, said blowing nozzle having an inner nozzle to convey metal vapor blowing gas to the inner surface of the liquid film and an outer nozzle to convey said molten glass to said orifice, the lower portion of said outer nozzle being tapered inwardly to form with the outer edge of the inner nozzle a fine gap, feeding the molten glass under pressure through said gap and forming said thin film of molten glass across said orifice of the blowing nozzle, applying said metal vapor blowing gas through said inner nozzle at positive pressure on the inner surface of the liquid film to blow the film radially outward to form the microsphere, continuously feeding said molten glass to said outer nozzle while said microsphere is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling, solidifying and hardening said microsphere to obtain microspheres of 500 to 6,000 microns diameter and 0.5 to 400 microns wall thickness, and depositing said metal vapor as a thin metal coating 50° to 600° A. thick on the innerwall surface of the microspheres to form microspheres having a contained vacuum having a pressure at ambient temperature which is about the vapor pressure of said metal at ambient temperature.

65. The method of claim 64 wherein the microspheres are partially flattened to form oblate spheroids.

66. The method of claim 64 wherein the blowing gas is zinc vapor, the microspheres are of substantially uniform diameter and wall thickness and there is deposited on the inner wall surface of the microspheres a thin transparent zinc metal coating less than 100° A. thick.

67. The method of claim 64 wherein the blowing gas is zinc vapor, the microspheres are of substantially uniform diameter and wall thickness and there is deposited on the inner wall surface of the microspheres a thin reflective zinc metal coating more than 100° A. thick.

68. The method of claim 17 wherein the microspheres are partially flattened to form oblate spheroids.

69. The method of claim 17 wherein the length of the connecting filaments is substantially equal and is 2 to 20 times the diameter of the microspheres.

70. The method of claim 17 wherein the length of the connecting filaments is substantially equal and the diameter of the connecting filaments is 1/2500 to 1/20 the diameter of the microspheres.

71. The method of claim 17 wherein the blowing gas is zinc vapor, the microspheres are of substantially uniform diameter and wall thickness, and there is deposited on the inner-wall surface of the microspheres a thin zinc metal coating less than 100° A. thick and transparent to visible light.

72. The method of claim 17 wherein the blowing gas is zinc vapor, the microspheres are of substantially uniform diameter and wall thickness, and there is deposited on the inner wall surface of the microspheres a thin zinc metal coating more than 100° A. thick and reflective of visible light.

* * * * *